United States Patent [19]
Wulkan et al.

[11] Patent Number: 5,862,203
[45] Date of Patent: Jan. 19, 1999

[54] TELECOMMUNICATIONS CALL MANAGEMENT SYSTEM

[75] Inventors: Itzhak Wulkan; Gideon Barak, both of Raanana, Israel

[73] Assignee: Call Manage, Raanana, Israel

[21] Appl. No.: 700,195

[22] Filed: Aug. 20, 1996

Related U.S. Application Data

[63] Continuation-in-part of Ser. No. 610,617, Mar. 4, 1996, which is a continuation-in-part of Ser. No. 505,024, Jul. 21, 1995, abandoned.

[51] Int. Cl.$^6$ .................................................. H04M 15/00
[52] U.S. Cl. ......................... 379/114; 379/112; 379/113; 379/130; 379/131
[58] Field of Search ............................ 379/111, 29, 112, 379/113, 114, 115, 120, 130, 131, 132

[56] References Cited

U.S. PATENT DOCUMENTS

| | | | |
|---|---|---|---|
| 4,656,319 | 4/1987 | Bially | 379/29 |
| 5,483,579 | 1/1996 | Stogel | 379/216 |

*Primary Examiner*—Vijay Shankar
*Attorney, Agent, or Firm*—Wilson Sonsini Goodrich & Rosati

[57] ABSTRACT

A call management system is disclosed for choosing the optimum telecommunications carrier for telephone calls made by a user. The system can interface with an existing PBX or with ordinary analog telephone lines. The system intercepts digits dialed by the caller or user and determines an optimum route for the call based on a plurality of parameters. The optimum route includes a particular carrier through which the call is to be placed. The system then dials the prefix for the carrier and subsequently places the destination digits originally dialed by the user onto the telephone line. A data server constructs a carrier selection table optimized for a user's location, calling habits, preferences, personal data, etc. The carrier selection table is downloaded via a communications network to a local computer. In one embodiment, the local computer receives call progress signals and the user's dialed digits from one or more line units. The local computer determines the optimum route utilizing the carrier selection database and passes the calling prefix and destination string to the line unit. In another embodiment, the local computer also performs the functions of the line unit via an attached modem. The local computer, using the modem, intercepts dialing digits, determines the optimum route, places the call, monitors the line for call progress signals and records call start and end times. In the event the modem cannot detect call progress signals, the local computer uses digital signal processing techniques to detect the tones.

13 Claims, 29 Drawing Sheets

TELECOMMUNICATIONS CALL MANAGEMENT SYSTEM

CROSS REFERENCE TO RELATED APPLICATIONS

This is a continuation-in-part of U.S. Ser. No. 08/610,617, filed on Mar. 4, 1996, which is a continuation-in-part of U.S. Ser. No. 08/505,024, filed Jul. 21, 1995 is now abandoned.

FIELD OF THE INVENTION

The present invention relates to telecommunications and more specifically, to a call management system for providing least cost routing, associated call accounting and carrier performance monitoring for telephone systems that are connected to analog telephone lines or trunk lines.

BACKGROUND OF THE INVENTION

The United States is divided into a plurality of contiguous, non-overlapping exchanges, referred to as Local Access Transport Areas (LATAs), each of which is served by a local telephone company. Telephone calls originating and terminating within the same exchange, referred to as intraLATA calls, are handled end-to-end by a local, intraLATA, telephone company referred to as the Local Exchange Carrier (LEC). Calls originating within one exchange or in a state or foreign country and terminating in a different exchange, potentially in a different state or foreign country, referred to as inter-exchange calls, are handled at each end by the intraLATA company or LEC that services the originating and the terminating exchanges. These inter-exchange calls are carried between the intraLATA companies by one or more inter-exchange carriers, known as long distance carriers.

A caller who wishes to select an inter-exchange carrier other than the default primary inter-exchange carrier (PIC) must dial special access codes that are assigned to each inter-exchange carrier and once connected, must sometimes also dial a personal identification code and the number of the called party to have the call completed. With the proliferation of inter-exchange carriers, carrier selection is often difficult for a telephone communication system user. The user may be unaware of which inter-exchange carrier, available in his/her area, is the most economical for a particular time of day, which inter-exchange carrier serves the user's telephone communication system or what access codes are appropriate for the particular inter-exchange carriers available to the user's telephone communication system.

During the last few years, the competition between telephone companies (also known as operating companies, service providers or carriers) for the telephone subscriber business has increased markedly. This competition is most evident in the multiplicity of tariffs from each carrier, which vary not only between destinations but also according to the nature of the contract signed between the subscriber and the telephone company, the time of day, the length of call and other numerous parameters. In addition, competition exists between intra-exchange service providers.

Though this competition gives the customer an opportunity for saving money, the customer rarely fully benefits because of the complexity and the variety of existing tariffs. For example, tariffs may vary due to the time of day, on weekends, holidays, according to the call destination, distance, method of payment and any time limited promotions. The situation may be further complicated by special limited discounts or other incentives offered by the telephone companies, the entry of new telephone companies to new markets and the grade of service requested (i.e., voice quality, connection delays and first time connection establishment success).

The entry of new money saving services, such as Fax Store and Forward and call-back services, the availability of alternate services offered by private networks using their own PBX and the usage of corporate networks are additional factors affecting the cost of the call. Consequently, the customer has to contend with a huge amount of information in order to determine how to make the least expensive telephone call. Because of the complexity of the charging schemes, a cost optimization on a per call basis is nearly impossible for a subscriber to perform by themselves.

Call management systems are applications suitable not just for large businesses with high call volumes but are also suitable for small office/home office (SOHO) as well. The bewildering array of service providers available and the existence of a complicated tariff structure combine to create a need for a system to manage the placement of telephone calls for SOHO applications.

U.S. Pat. No. 4,791,665 to Bogart et al. describes a telephone communication system (PBX) with the capability of automatically selecting one of a plurality of inter-exchange carriers. The system includes a database containing access code data associated with the inter-exchange carriers, user authorization codes and information about the various inter-exchange carrier billing rates based on time of day and destination. The PBX scans the database and reroutes the originating call to one of the other inter-exchange carriers having a cheaper tariff for the particular destination at the specific time of day. The PBX sends out the inter-exchange carrier access code, the user's personal identification code and the called party number dialed by the user to complete the call.

U.S. Pat. No. 5,425,084 to Brinskele describes a computer controlled telephone communication system which includes a plurality of digital switches each located in different charge zones. Each digital switch is coupled to a file server which determines which of the digital switches to use in order to ensure the lowest possible cost for the call.

U.S. Pat. No. 5,420,914 to Blumhardt describes a real time selection of one of a plurality of inter-exchange carriers which automatically selects the carrier having the least expensive toll at the time the call is made and reroutes the call accordingly. Blumhardt is used in conjunction with an advanced intelligent network (AIN) in a public switched telephone network (PSTN).

U.S. Pat. No. 5,425,085, issued to Weinberger et al., teaches a device that interconnects with the telephone line coming from a first phone and routes telephone calls along a least cost route originating from the first telephone to a second telephone via the network. A database stores billing rate parameters for determining various communications paths of different carriers based on parameters such as the time and date of the call.

U.S. Pat. No. 5,519,769, issued to Weinberger et al., teaches a system for updating a database which stores billing rate parameters for call rating devices associated with a calling station. At predetermined times the calling station calls a rate provider which provides billing rate data parameters for a plurality of calling stations.

U.S. Pat. No. 5,473,630, issued to Penzias et al., teaches a method of accessing long distance rate information available in a database provided by inter-change carriers. PBXs and telephone central offices access that rate information using ISDN and/or SS7 signaling and use it as a basis for determining which carrier to use at any given time in the routing of a call.

In prior art call management systems, updating the tariff database is very complicated since the interface to do so is cumbersome and a huge amount of complex data is involved. Therefore, the operators of the call management system rarely update their tariff databases. As a result, the routing decision taken may not necessarily be the optimum route for the call, at that time.

SUMMARY OF THE INVENTION

Accordingly, it is an object of the present invention to provide a call management system for performing call optimization on a per call basis, providing subscribers with reduced telephone utility charges.

Another object of the present invention is to provide a call management system for performing cost optimization on a per call basis that is transparent to the subscriber and does not require the subscriber to have special know how or skills.

It is another object of the present invention to provide a call management system that monitors the quality and performance of the connections made by telecommunications carriers.

Yet another object of the present invention is to provide a call management system that calculates the least cost route for a particular telephone call.

Another object of the present invention is to provide a call management system that maintains call accounting on each call made through the system.

Yet another object of the present invention is to provide a tariff data server for monitoring and updating changes in telephone service provider tariffs and for downloading a database of tariff data to the local computer.

Another object of the present invention is to provide a line unit capable of receiving an abridged version of the database known as the carrier selection database from the local computer.

It is another object of the present invention to provide a line unit capable of receiving an abridged version of the database known as the carrier selection database from the data server.

Yet another object of the present invention is to provide a tariff data server, local computer and line unit that can be linked to a public access network, such as the Internet or a bulletin board system (BBS), in order to make tariff data available to subscribers.

Another object of the present invention is to provide a call management system for intercepting digits dialed from a subscriber's telephone set and calculating the optimum route for the call.

There is thus provided in accordance with a preferred embodiment of the present invention a telecommunication call management system for determining an optimum telecommunication carrier for a telephone call made by a subscriber, the telephone call routed through a telephone line to a local exchange carrier, the local exchange carrier coupled to one of M long distance carriers, the system comprising a data server coupled to a communications network, the data server for managing a database containing tariff and geographical related information on local and long distance carriers, local exchange, telephone exchange location related data and subscribers and for generating a carrier selection database from selected deterministic and statistical parameters, and a local computer coupled to a plurality of telephone devices, the local exchange carrier and the communications network, the local computer for intercepting a call dialed by the subscriber, monitoring the telephone line, choosing the optimum carrier from the carrier selection database and placing the call utilizing the optimum carrier.

The data server comprises a processor for controlling the operation of the data server, a server database interface coupled to the processor, the server database interface for fulfilling database requests issued by the processor, a server database coupled to the server database interface, the server database containing tariff related information on local and long distance carriers, a client communications module coupled to the processor and to the communications network, the client communications module for managing communications between the processor and the local computer, a call accounting module for processing call data uploaded from the local computer, a personal data database holding data relevant to the subscriber's location and calling preferences, and a local computer database preparation module coupled to the processor, the local computer database preparation module determining, a priori, optimum carriers for calls placed by the subscriber from the subscriber's location to almost all possible destinations, the local computer database preparation module utilizing the optimum carriers in constructing the carrier selection database.

The local computer comprises a processor controller for controlling the operation of the local computer, a modem coupled to the processor, a modem control module coupled to the processor for managing and controlling the modem, a data server interface coupled to the processor, the data server interface for interfacing with the data server through the communications network, and carrier selection means comprising a carrier selection database for enabling the at least one line unit to determine the optimum carrier for a telephone call.

In addition, the modem is able to connect and disconnect the telephone devices to the telephone line and is able to channel an audio signal from either the telephone devices or the telephone line to the local computer. Also, the modem is adapted to report call progress tones whereby the local computer can determine start and end times of the telephone call.

The local computer comprises a digital signal processing module for detecting call progress tones in an audio signal present on the telephone line.

The modem comprises a dialing receiver for intercepting digits dialed by the subscriber using one of the telephone devices, a dialer for receiving a dialing string from the processor and causing the dialing string to be dialed onto the telephone line, a pass through having a first and second state, both the first and the second states controlled by the processor, the first state blocking the telephone devices from the telephone line, the second state coupling the telephone devices to the telephone line, a line monitor for detecting and interpreting signals originating from the telephone devices or from the telephone line, and means for connecting an audio signal from the telephone line to the local computer.

The local computer comprises a call history logging module coupled to the processor, the call history logging module logging calls placed by the subscriber and determining subscriber call characteristics, and a performance monitoring module coupled to the processor, the performance monitoring module for managing the selection of the long distance carriers based on quality and performance of their connections.

The local computer comprises a call accounting module coupled to the processor, the call accounting module for determining subscriber calling characteristics, and a call accounting database coupled to the processor for storing call accounting information gathered by the local computer.

The local computer comprises a reporting module coupled to the processor, the reporting module for producing reports from data collected by the local computer both automatically and manually. The local computer also comprises a personal information database coupled to the processor, the personal information database storing data downloaded from the data server, data entered by the subscriber or data collected via the local computer.

There is also provided in accordance with a preferred embodiment of the present invention, in a telecommunication call management system for determining an optimum telecommunication carrier for a telephone call made by a subscriber, the telephone call placed via a telephone device and routed through a telephone line to a local exchange carrier, the local exchange carrier coupled to one of M long distance carriers, a method of placing the telephone call, the method comprising the steps of detecting the telephone device going off-hook, disconnecting the telephone device from the telephone line, providing the telephone device with simulated dial tone, capturing a first digit dialed by the subscriber and ceasing to provide the telephone device with the simulated dial tone, capturing remaining digits dialed by the subscriber, determining an optimum telecommunication carrier for the telephone call and generating a complete dialing string, placing the complete dialing string onto the telephone line, and monitoring the telephone line.

There is further provided in accordance with a preferred embodiment of the present invention, in a telecommunication call management system for determining an optimum telecommunication carrier for a telephone call made by a subscriber, the telephone call placed via a personal information manager and routed through a telephone line to a local exchange carrier, the local exchange carrier coupled to one of M long distance carriers, the telecommunication call management system incorporating a modem, a method of placing the telephone call, the method comprising the steps of the subscriber requesting a telephone call to be placed, the personal information manager transmitting the dialing digits for the telephone call, intercepting the dialing digits, determining an optimum telecommunication carrier for the telephone call, placing the complete dialing string onto the telephone line, and monitoring the telephone line.

The step of monitoring comprises the steps of detecting the call progress tones and the presence of a voice signal on the telephone line utilizing the modem, connecting the telephone device to the telephone line, detecting the end of ringback tone on the telephone line and recording the time thereof and detecting the termination of the telephone call and recording the time thereof.

The step of detecting the presence of a voice signal on the telephone line utilizing the modem comprises determining whether the modem is capable of detecting the call progress tones, if the modem is capable, utilizing the modem to detect the call progress tones, and if the modem is not capable, applying signal processing techniques to an audio signal on the telephone line to detect the call progress tones.

BRIEF DESCRIPTION OF THE DRAWINGS

The invention is herein described, by way of example only, with reference to the accompanying drawings, wherein.

DETAILED DESCRIPTION OF THE INVENTION

Figure 1:
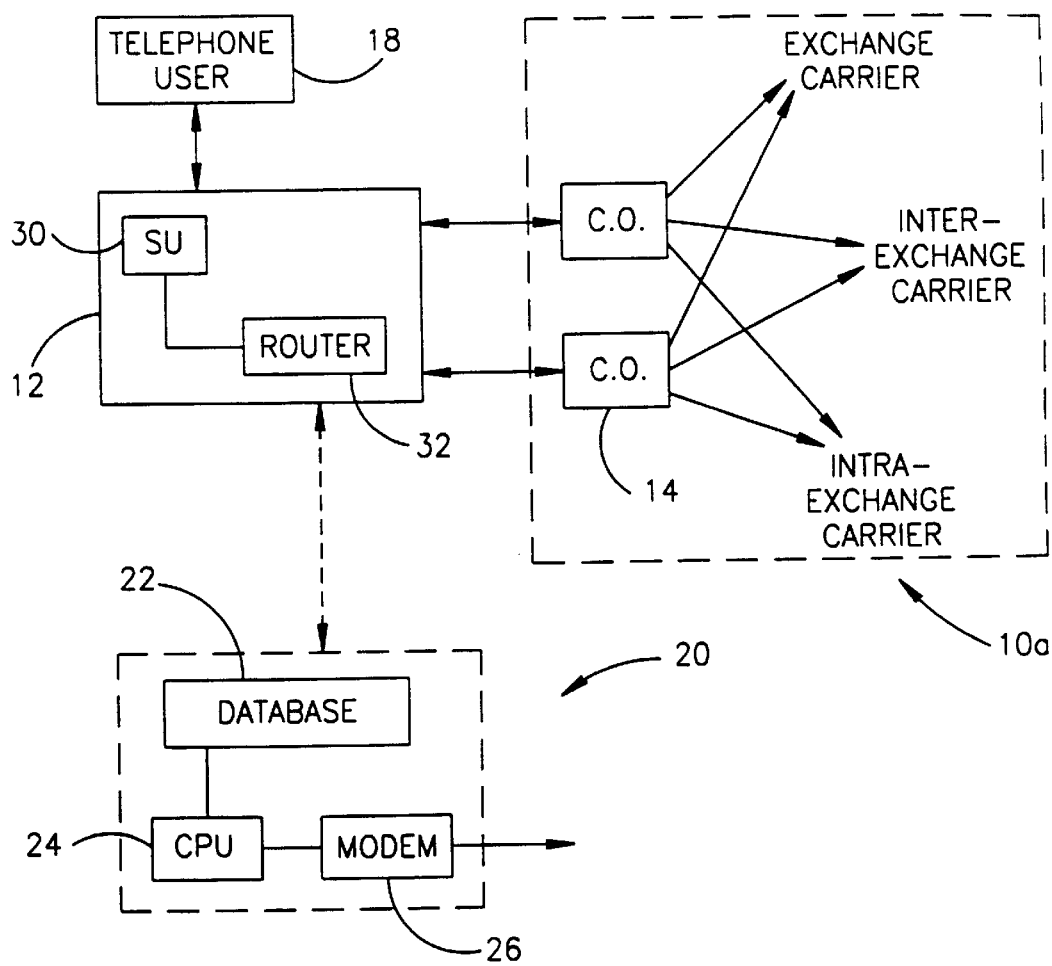
FIG. 1 is block diagram illustrating the call management system constructed and operative in accordance with a preferred embodiment of the present invention.

Reference is made to FIG. 1, which is a block diagram illustrating the call management system constructed and operative in accordance with a preferred embodiment of the present invention. FIG. 1 illustrates a simplified version of a telephone communication system, generally designated 10, comprising a single telephone dialing unit 12 in communication with a central switching office (CO) 14 of one of a plurality of telephone service providers. Telephone dialing unit 12 can also communicate with other central switching offices 14 as desired.

The call management system comprises a data server, generally designated 20, which comprises a database 22. The information in database 22 is updated by a data server operator whenever a change is made in any of the published rates of a telephone service provider, such as a local exchange carrier (LEC) or long distance carrier. The updated information is converted into a suitable format for onward transmission and communicated, by data server 20, to telephone dialing unit 12.

The information stored in database 22 includes, inter alia, all available tariff data from the multiplicity of service providers, both inter and intra-exchange carriers, international and others, serving the telephone communication system 10. IntraLATA carriers or LECs are carriers operating within a single Local Area Transport Area (LATA). Calls within the LATA can be either local calls served by the LEC or intraLATA calls served by other carriers as well. If the dialing system operates with more than one central switching office, the following is also stored: tariffs for the different central switching offices, local exchange coordinates, enabling the calculation of exchange distances, carrier availability, access code per exchange and a list of all the exchanges constituting a local call for each exchange. The information may be stored in any convenient format, known in the art such as a look-up table or a database.

Data server 20 further comprises a central processing unit (CPU) 24 and communication means such as a modem 26 or other similar apparatus for communicating via telephone lines (e.g., dedicated T1, ISDN, broadband communications, etc.) or via any suitable data communication network (e.g., the Internet). Central processing unit 24, which may be any commercially available processor, controls the operation of data server 20. Modem 26 is used to transfer updated data directly to dialing unit 12. Alternatively, modem 26 can transfer updated data to a third party, such as an electronic mail (e-mail) address from where it may be collected by dialing unit 12 or by an operator.

Telephone dialing unit 12 comprises a dialing unit, such as a tone or pulse telephone dialer, a modem or an ISDN dialing unit, and also comprises a storage unit 30 and a router (or route selector) 32. Storage unit 30 is any storage medium, known in the art, which can be used, inter alia, for storing the provider and tariff information received from data server 20. Storage unit 30 may also be used to store any other relevant data, such as subscribed to carriers, special negotiated discounts, promotions, call statistics data and call accounting data, which may be needed by the router to calculate the optimum least cost route (LCR) for telephone calls. Router 32 can be any routing unit, known in the art, which recognizes the dialing information input by the call originator and, in accordance with pre-defined parameters, calculates the LCR and consequently reroutes the call. Router 32 can also include routing features as described hereinbelow.

Whenever telephone user (or subscriber) 18 originates a call, router 32 intercepts the digits of the dialed number and processes the calling information. Note that the telephone call may not only be generated by a human but also by a machine. Thus, the 'user' may be a human or a machine. Router 32 then accesses storage unit 30, calculates the least cost routing (LCR) data to ascertain the optimum route for the call, adds any necessary access and authorization codes, and then passes the resulting route selection data to dialing unit 12. Dialing unit 12 then initiates the call to CO 14 which routes the call in accordance with the route selection data signals sent by dialing unit 12. If there is more than one CO, dialing unit 12 also physically switches the connection to the selected CO 14.

In order for telephone user 18 to obtain the maximum benefit from the plurality of constantly changing tariff rates, it is necessary to maintain an accurate and updated database in storage unit 30. Whenever a change in any of the tariffs is made by any of the providers or central switching offices, the information stored in database 22 is updated by the data server operator. An updated file is then sent by modem 26 to storage unit 30, either directly or preferably via e-mail or the Internet. Alternatively, a diskette containing the updated information can be loaded directly by the telephone user 18 into the storage unit 30, as is known in the art.

Figure 2:
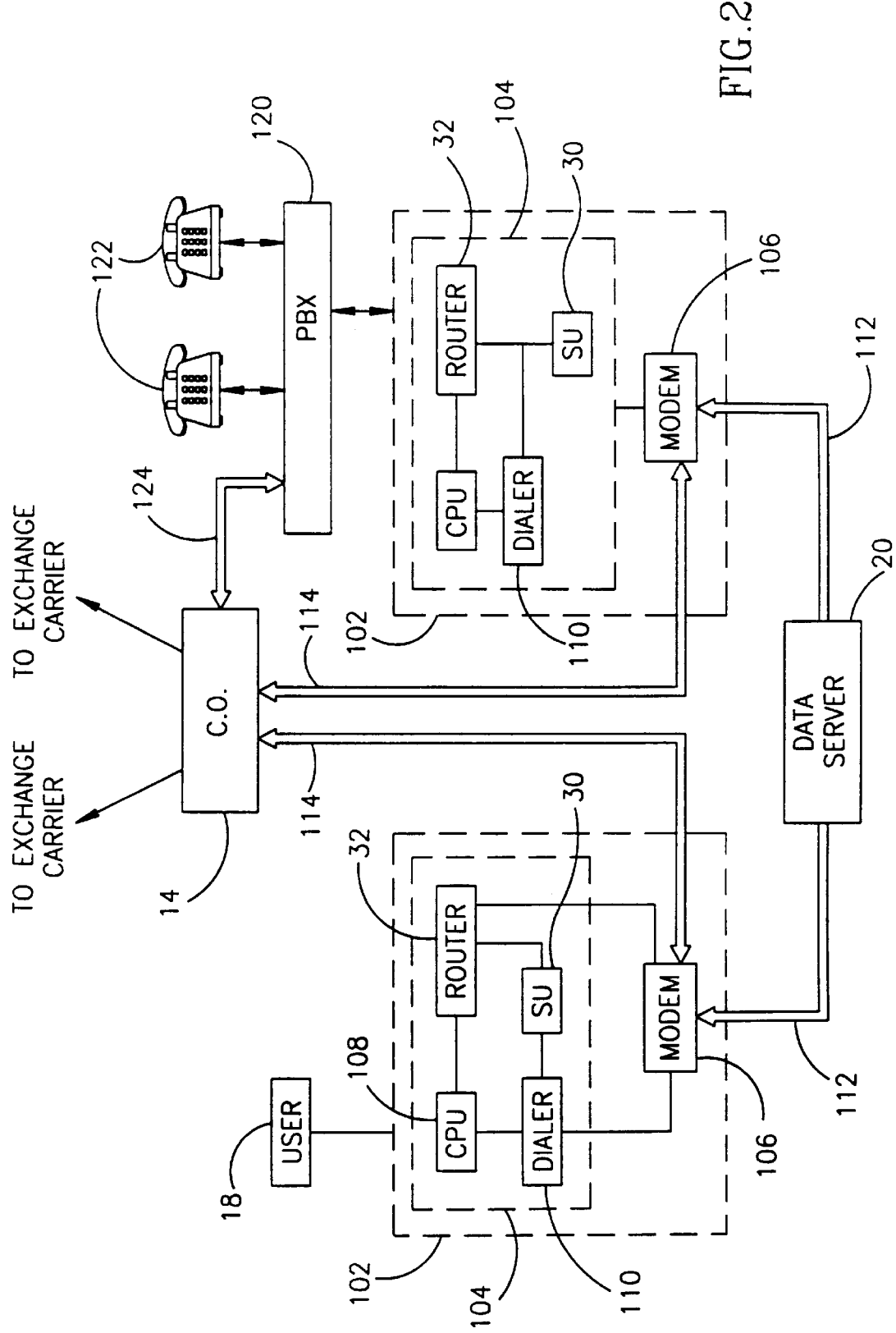
FIG. 2 is a block diagram illustrating the relation of the data server to a plurality of telephone dialing units of the preferred embodiment of the present invention.

Reference is now made to FIG. 2 which is a block diagram illustrating the relation of data server 20 to a plurality of telephone dialing units 102. For simplicity, each telephone dialing unit 122 is shown communicating with only one CO 14. Embodiments having similar elements have similar reference numerals throughout.

In a first embodiment, telephone dialing unit 102 comprises a computer, such as a personal computer (PC) 104 connected to a modem 106. PC 104 and modem 106 are of types commercially available. PC 104 comprises a central processing unit (CPU) 108 which controls the operation of the PC 104 and optionally a built-in dialer 110. Modem 106 is used to receive data from data server 20 (double line 112) and to connect dialing unit 102 to CO 14 (double line 114). Modem 106 maybe a dial-up modem which can alternatively be used to directly dial CO 14, without the need for a separate dialer. PC 104 further comprises the storage unit 30 and router 32, described hereinabove. Built-in dialer 110 is, for example, any commercially available computer based communications program incorporating dialing facilities.

To make a call, user 18 utilizes a user interface, such as a keyboard, a mouse, etc., to initiate the call and dial the number. Router 32 intercepts the digits of the dialed number, processes the calling information and accesses storage unit 30, processes the LCR data and selects the optimum route for the call. The call is then dialed by modem 106 in accordance with the optimum routing information ascertained and correspondingly rerouted via CO 14.

In a second embodiment, telephone dialing unit 102, which is similar to the first embodiment, described hereinabove, is also connected to a telephone communications system serving a plurality of stations, such as a Centrex (or CTX) or private branch exchange (PBX) 120, having a plurality of telephones 122 connected thereto. The PBX 120 does not have any least cost routing capabilities.

In this embodiment, the caller may initiate the call by using the built-in dialer 110 to dial the number, as described hereinabove with respect to the first embodiment. In this case, the call is dialed out via the PBX 120 (double line 124). Persons who are not connected to a PC having the relevant LCR data may dial out via the PBX 120 (double line 124).

In a further embodiment, PBX 120 is connected directly to PC 104. The PBX 120 can be configured to intercept dialing by telephones 122 and access the storage unit 30 and router 32 of PC 104 to extract the optimum LCR information and reroute the calls.

Whenever the PBX 120, which is connected to PC 104, receives a call, the PBX 120 accesses the storage unit 30 containing the LCR data. Router 32 processes the call data and selects the optimum route for the call and then PBX 120 dials this optimum route.

It will be appreciated that the router 32 can be implemented as part of the telephone dialing unit 102, as part of the PBX 120 or between the PBX 120 and the central switching office 14. No matter where the router 32 is implemented, it provides routing for the call initiated by the telephone 122. If the PBX 120 has routing abilities, and the router 32 operates after the PBX 120, the router 32 can change the routing decisions of the PBX 120. This is especially useful if the router of the PBX 120 has a difficult interface and therefore, is not updated often. The user will still receive the least cost route since the router 32 is updated frequently by data server 20.

Data server 20 can communicate with any or all of the systems described hereinabove. Whenever it has update tariff information, it sends the updated information to all of the systems with which it communicates. The data server 20 can also update the tariff information within a prior art router by emulating the operator interface which has to enter the tariff information.

It will be appreciated that the router 32 can also be operated in conjunction with a cellular or wireless telephone. As in the previous embodiments, router 32 can be embedded in such cellular or wireless telephones or it can be formed as a separate unit.

Finally, it is noted that, in accordance with the present invention, the telephone service providers with which the router 32 operates can be any type of service provider, including but not limited to: inter-exchange carriers, intra-exchange carriers, international, fax-store-and-forward providers, call-back service providers, local central switching offices and private networks. For fax-store-and-forward providers and call-back service providers, the router 32 or some other portion of the dialing system manages the protocol by which such providers operate.

Figure 3:
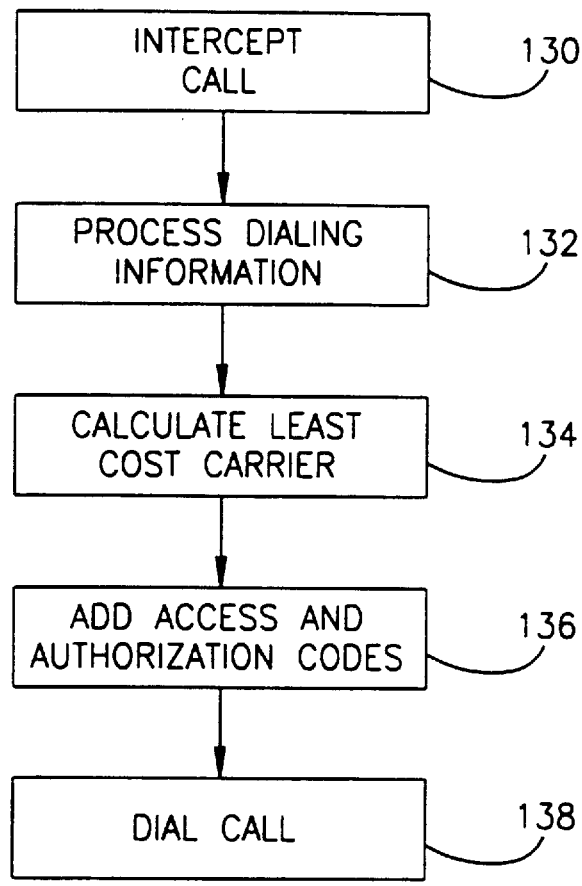
FIG. 3 is a flow chart illustrating a method of real time call routing using the call management system of the present invention.
Figure 4:
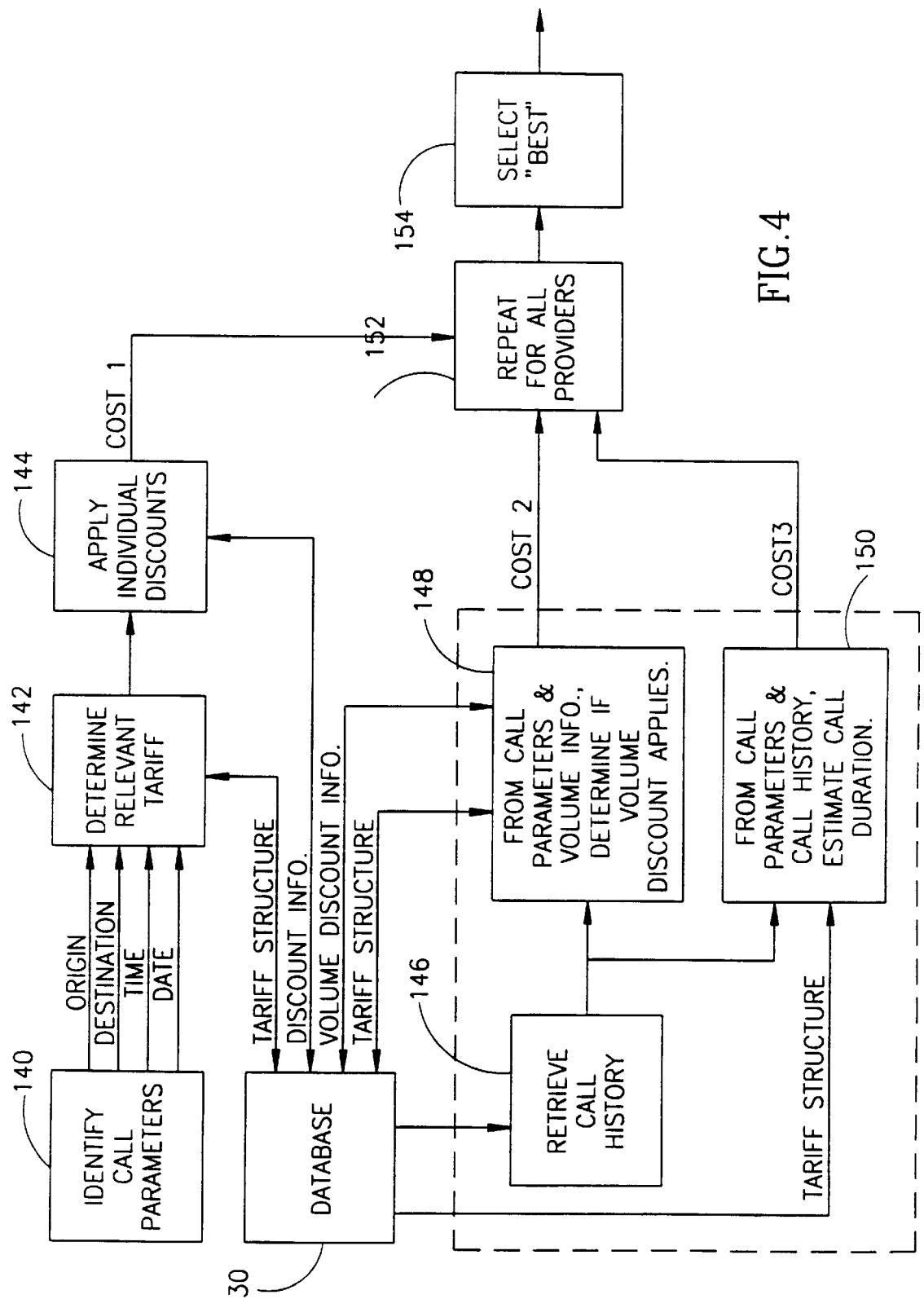
FIG. 4 is a detailed flow chart illustrating the step of processing the dialing information.

Reference is now made to FIGS. 3 and 4. FIG. 3 is a flow chart illustrating a method of real time optimum routing of a telephone call, using the call management system of the present invention. FIG. 4 is a detailed flow chart illustrating the step of processing the dialing information.

When a call is initiated, router 32 intercepts the call (step 130) and processes the dialing information (step 132). The router then processes the dialing information, as described hereinbelow, and calculates, from all the relevant calling and provider charging and subscriber data, which provider is preferred in order to obtain the least cost route (step 134). Having selected the provider, any necessary access and authorization codes are added to the dialing parameters (step 136) and the call re-dialed using the adjusted parameters (step 138).

The step of processing the dialing information is detailed in FIG. 4. The call parameters, such as date and time of the call together with the originating and destination numbers, are identified (step 140). Storage unit 30 containing the LCR data is accessed and scanned to retrieve charging data for the particular calling parameters identified in accordance with the distance and the call type (i.e., jurisdiction). The basic cost of the desired call is then determined (step 142).

Storage unit 30 is also scanned to ascertain whether the call initiator is entitled to any special negotiated discounts from one or more providers, and if relevant, the data is retrieved and the relevant discount is applied (step 144). The result is a first value for the cost of the call, per minute.

Optionally, a check can be made to determine whether call accounting data, as is known in the art, is available and if so the relevant data is retrieved (step 146). This data provides a history of the calls made with a particular service provider and is utilized, for example, to determine (step 148) whether or not a volume discount currently applies or whether it is useful to utilize a certain service provider in order to achieve the volume discount. A volume discount cost is produced.

From the call history, statistics of previous call durations can be made. For example, the statistics can be of the call duration per destination phone number, per distance away from the originating phone number or any other statistic. From these statistics, it can be determined if the call is expected to be short or long, in which case, the tariff of one service provider may be better than that of another for the expected length of the call. In addition, a call distribution profile is maintained based on past calling history. The call distribution data and its effect on call pricing are used in estimating the cost of the call. For example, an average call of 1.5 minutes would be cheaper using a more expensive carrier that bills using 6 sec/6 sec billing rather than a less expensive carrier that bills using 60 sec/60 sec billing. A user making many short duration calls, for example 10–15 seconds, would prefer 6 sec/6 sec billing over 60 sec/60 sec billing. An expected cost of the call is produced (step 150).

The above steps are repeated (step 152) for all service providers and the optimum service provider (i.e., the one which provides the lowest cost) is selected (step 154). In addition, the information regarding the call (origin, destination, selected provider, and length of call) are stored in the database for later call history use.

Figure 5:
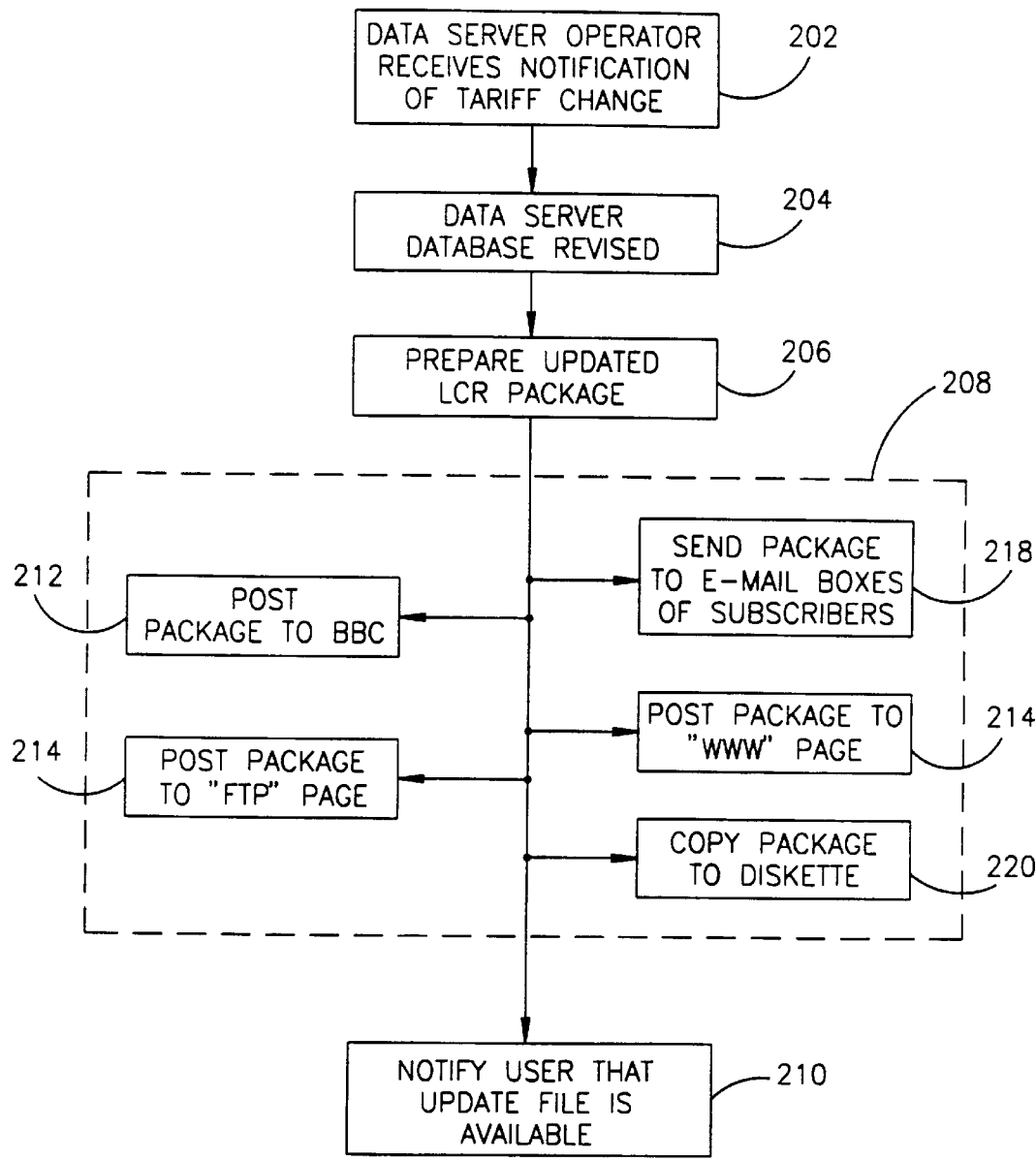
FIG. 5 is a flow chart illustrating the process of updating the storage unit.

Reference is now made to FIG. 5 which is a flow chart diagram illustrating the process of updating storage unit 30 belonging to telephone user 18.

Whenever data server 20 receives notification of a change from one of the telephone service providers or a regulatory body (e.g., changes in the dialing plan of the United States such as new area codes) (step 202), database 22 is revised (step 204). A package containing the updated LCR information is prepared (step 206), for example in the form of a data file. Data server 20 then posts the updated LCR package to an accessible medium (step 208), shown by dashed lines, and notifies telephone user 18, by any suitable means, that an updated file is available for downloading or collection (step 210).

The accessible medium to which the LCR package may be posted include, for example, any suitable forum accessible by modem. For example, the files can be made available by data server 20 to subscribers 18 through a bulletin board (step 212), via file transfer using a file transfer protocol (FTP) (step 214) or world wide web (WWW) (step 216), or similar, such as are available today through the Internet. The updated package can also be downloaded by data server 20 to the user's e-mail address (218) or copied to a diskette and mailed to the user (220).

To update the routing data stored in storage unit 20, user 18 can retrieve (or upload) the updated file, via his modem 106, from one of the sites (described hereinabove) to which it has been downloaded by data server 20. The updated data is then stored in storage unit 30.

Figure 6:
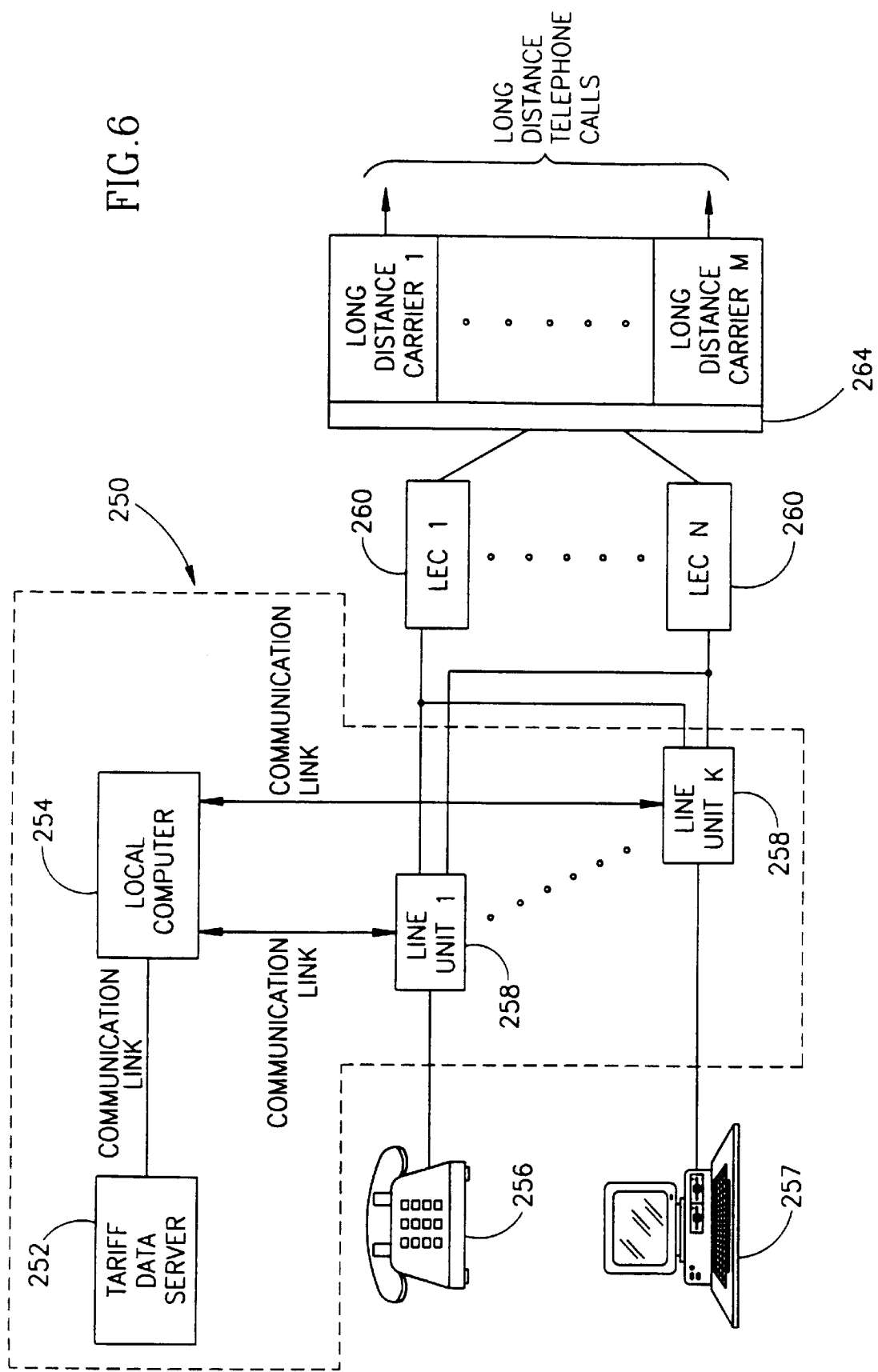
FIG. 6 is a high level block diagram illustrating an example of a call management system built in accordance with a preferred embodiment of the present invention and utilizing a generic communications link.

In a preferred embodiment, the tariff rate database, the least cost routing process and the telephone line interface circuitry are implemented as a distributed system of interconnected components. A high level block diagram of an example of a call management system constructed in accordance with a preferred embodiment of the present invention is illustrated in FIG. 6. The call management system, generally referred to by reference numeral 250, comprises a tariff data server 252, a local client computer 254 and one or more line units 258. System 250 interfaces to analog lines and/or trunks such as those commonly used with residential or small or medium office PBX telephone systems. Tariff data server 252 holds tariff and subscriber related data. The tariff information includes data on different carriers including both local and long distance telephone companies. The tariff data covers different tariff schemes available from each telephone company at each locality and comprises exchange location data for distance dependent tariffs, carrier availability and access codes and the exchanges constituting local calling areas. The tariff data is downloaded to local client computer 254 either periodically or according to another schedule such as upon a modification to a tariff schedule. Tariff data server 252 is coupled to local client computer 254 by a communications link. The communications link may include any suitable type of link (e.g., the Internet) such as a pair of modems over an ordinary telephone line, leased or private line, etc.

Any number of line units 258, labeled 1 through N in FIG. 6, are installed between a telephone set 256 and the public telephone network. In addition to telephone set 256, line units 258 may be coupled to one or more personal computers 257 with telephone dialing capabilities (i.e., attached fax/modem cards). The public telephone network is represented by Local Exchange Carriers (LECs) 260, 262. Each LEC, in turn, is coupled to one or more long distance carriers 264 labeled 1 through M. Long distance telephone calls made by a subscriber are placed by one of N long distance carriers 264. Line unit 258 communicates with local client computer via a communications link. The communications link may be wired or wireless (i.e., RF, infrared, etc.) and is a bi-directional communications channel. When a call is placed, one of the line units 258 intercepts digits dialed by the subscriber through coupled telephone set 256 and routes them to local client computer 254. Local client computer 254 computes the least cost route using various parameters and translates the dialed number into a series of digits that will route the call to the least cost carrier. The translated dialing string is sent to the line unit 258 which actually dials the number. In a preferred embodiment, each line unit 258 is able to connect to any number of N LECs. When more than one LEC is available, local client computer 254 calculates the least cost LEC, in addition to the least cost long distance carrier, and instructs line unit 258 to steer the call to that LEC.

Local client computer 254 controls the determination of the telephone dialing string corresponding to the optimum LEC and long distance carrier. Local client computer 254, a personal computer (PC) or other suitable computing means, accumulates the outgoing call data (i.e., destination, time, duration, etc.). The collected data serves as the basis for call accounting, call statistics, volume discount, call progress and call savings reports. Note that in the case of a PBX, the call data may be reported via a channel within the PBX rather than the line unit.

Local client computer 254 is typically coupled to more than one line unit 258. Preferably a line unit is coupled to every telephone set in the system. This provides maximum savings by intercepting each call and determining the optimum carrier to place the call through. Each line unit is coupled to local client computer 254 via a wired or wireless communications link. Local client computer 254, in addition to line unit 258 and tariff data server 252, are described in more detail below.

Figure 7:
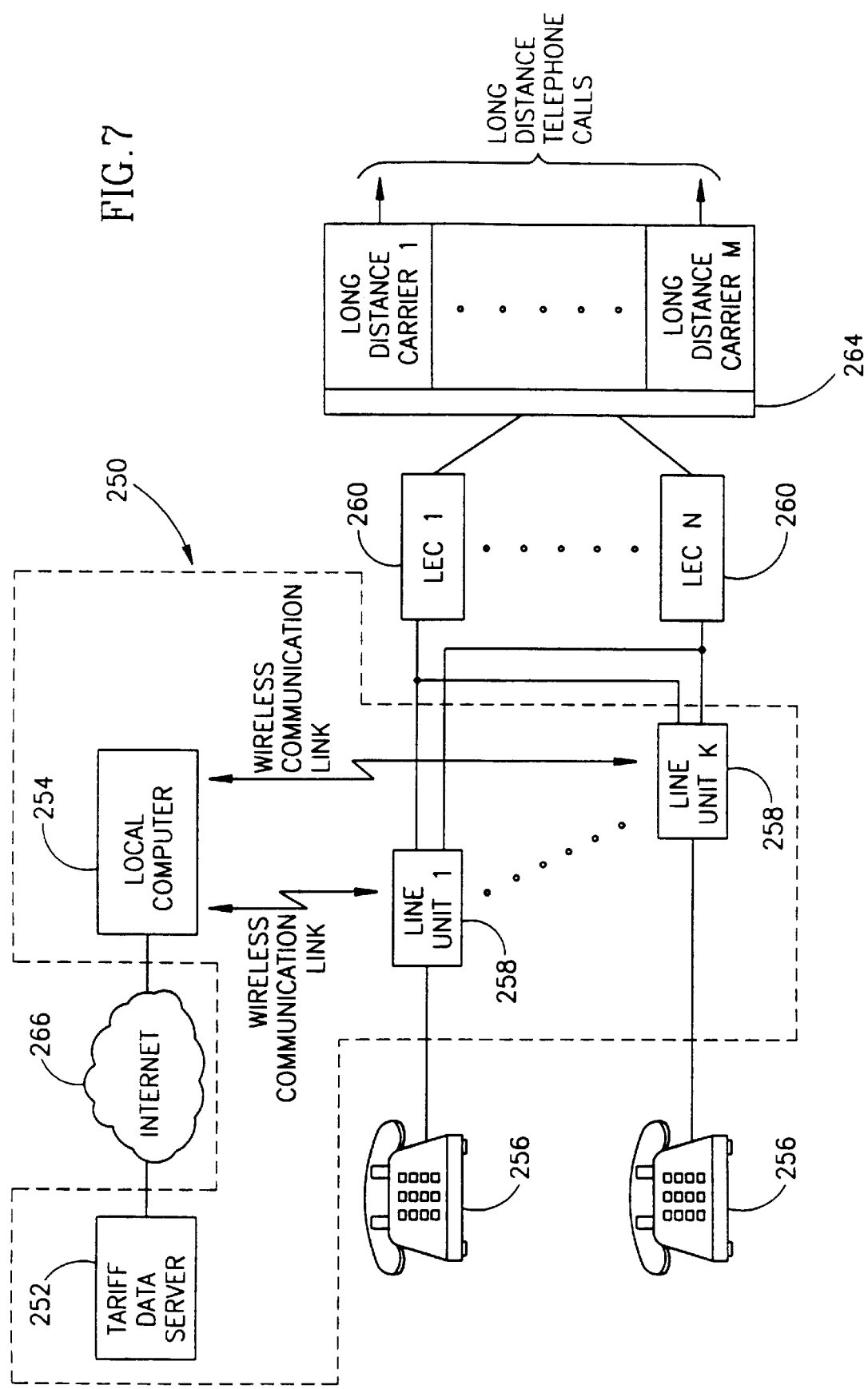
FIG. 7 is a high level block diagram illustrating an example of a call management system built in accordance with a preferred embodiment of the present invention and utilizing the Internet as the communications link.

In a preferred embodiment, shown in FIG. 7, system 250 utilizes the Internet 266 for the communication link between tariff data server 252 and local client computer 254. System 250 incorporates use of the various standard applications available on the Internet including, but not limited to, electronic mail (SMTP), file transfer protocol (FTP), gopher and the world wide web (WWW). In addition, local client computer 254 is coupled to one or more line units 258 via a wireless link (i.e., RF, infrared, etc.).

Figure 8:
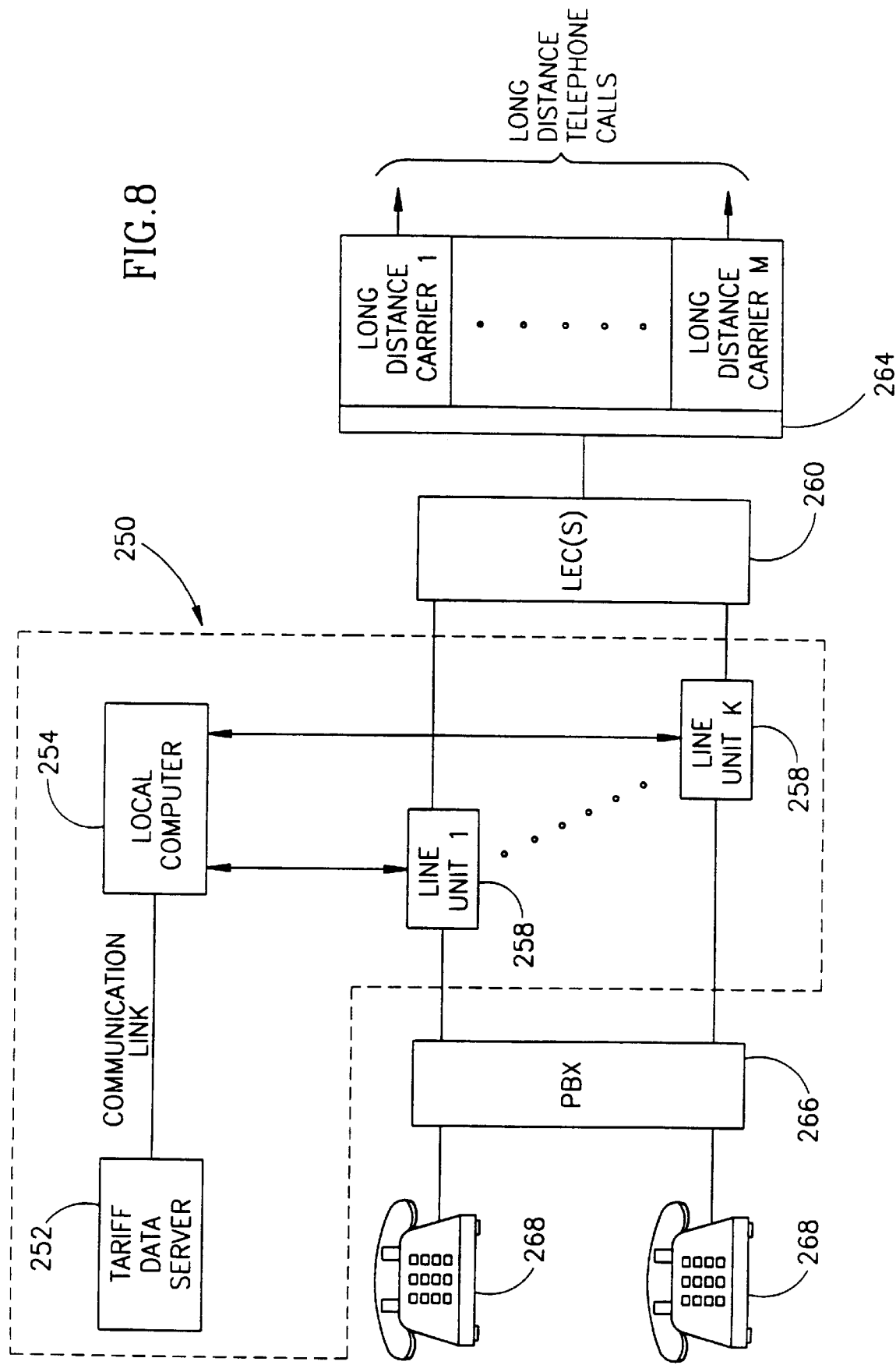
FIG. 8 is a high level block diagram illustrating an example of a call management system coupled to a PBX and built in accordance with a preferred embodiment of the present invention.

In a preferred embodiment, shown in FIG. 8, system 250 is adapted to perform call management for users of a small PBX 266. Referring to FIG. 8, tariff rate server 252 is coupled, via a communication link, to local client computer 254. A line unit 258 is associated with each trunk in the PBX system. Each line unit is coupled to local client computer 254 via either a wired or wireless communication link. Each line unit is also coupled to one or more LECs 260, which in turn place long distance calls through one or more long distance carriers 264.

Figure 9:
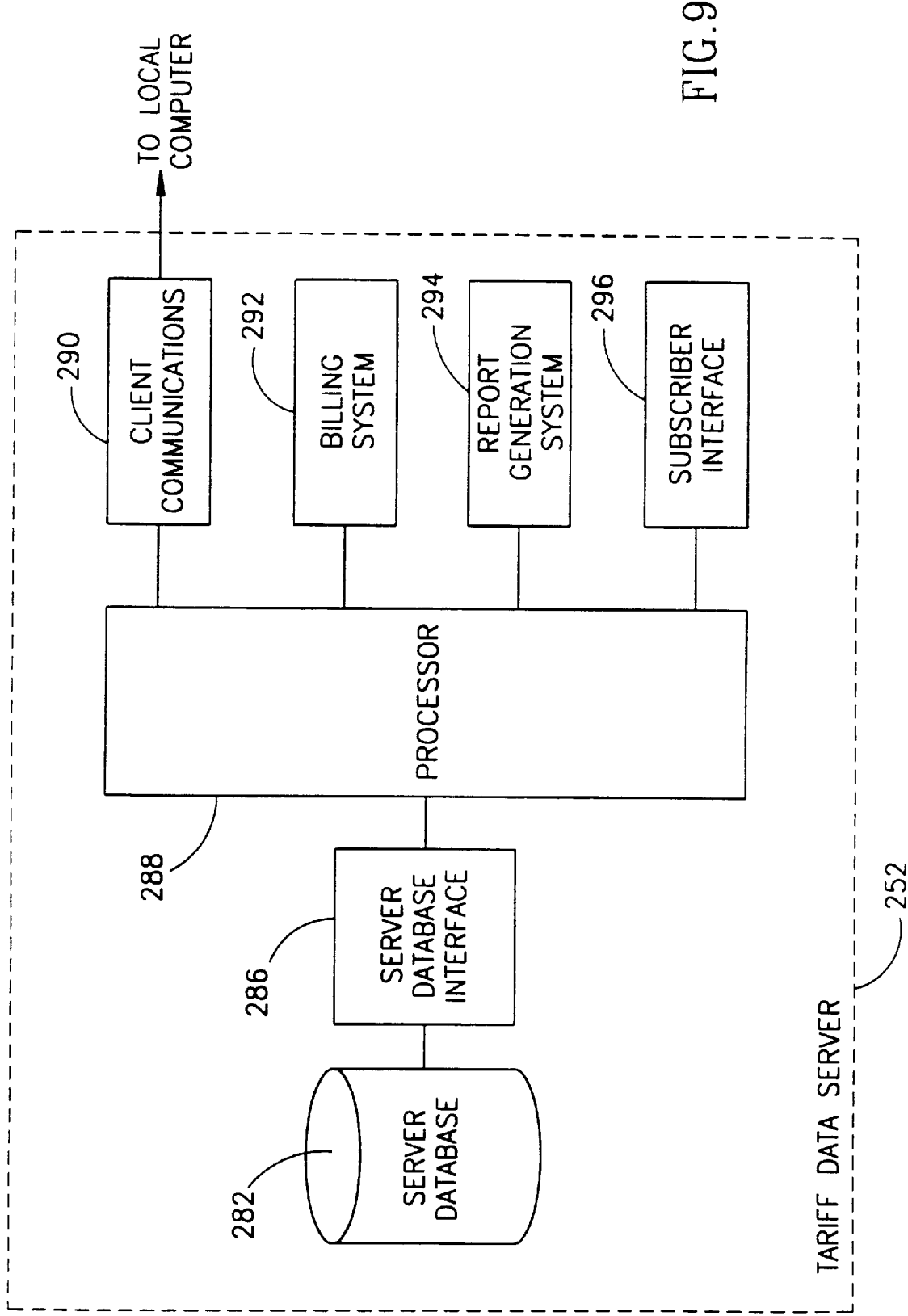
FIG. 9 is a detailed block diagram illustrating the tariff data server portion of the present invention.

The tariff data server 252 will now be described in more detail. A detailed block diagram of the tariff database server is illustrated in FIG. 9. Tariff database server 252 comprises a processor 288, a server database interface 286, a server database 282, a client communication module 290, a billing system 292, a report generation system 294 and a subscription interface module 296. As discussed previously, the function of tariff data server 252 is to provide each subscriber with current tariff schedule data to allow the least cost routing module in local client computer 254 (FIG. 6) to determine the least cost route in an accurate manner, reflecting up to date tariff information. The server updates a client database maintained on the local client computer only with tariff data relevant to the subscribers location and which may be based on subscriber provided information. Subscriber location is stored according to the numbering plan area (NPA) and the local exchange (NXX).

The tariff data server communicates with the local client computer, located in the client portion of call management system 250, via a communications link. Processor 288 controls client communications module 290, which handles all communications between the tariff data server and the local client computer. Call management system includes an update mechanism to allow a client database to reflect ongoing changes to tariff schedules and carrier's optional calling plans (OCPs). Server communications can take place via any suitable means, such as electronic mail (e-mail) or FTP. A subscriber can choose to receive updates in any one of the following ways: per tariff change or periodically. In both cases, either the entire database can be downloaded or only the relevant database transactions need be sent. In addition, the subscriber or client can initiate a database transmission. Either a complete database download or only a portion of it can be sent via e-mail to the subscriber. The local client computer then extracts from the e-mail message the relevant data and updates its client database.

In accordance with a further aspect of the present invention, the call accounting information accumulated by the local computer can be uploaded to the data server and analyzed further. Based on this analysis, the data server suggest means for further reducing the telecommunication charges for the subscriber. Example recommendations include changing OCP, subscribing to an additional carrier, getting a direct access number, etc.

Billing system 292, coupled to processor 288, functions to maintain subscriber information needed for billing purposes, if system services are sold on a monthly basis, and to track and update invoices, bills, payments, etc. for all subscribers. Report system 294 functions to generate various types of reports for system 250. Reports that pertain to subscriber information, OCP reports and carrier reports are an example of the types of reports available. Subscriber interface 296 receives and processes registration forms containing subscriber data. The data is received either via e-mail, fax, regular mail, etc. and the data processed and entered into attached server database 282.

Figure 10:
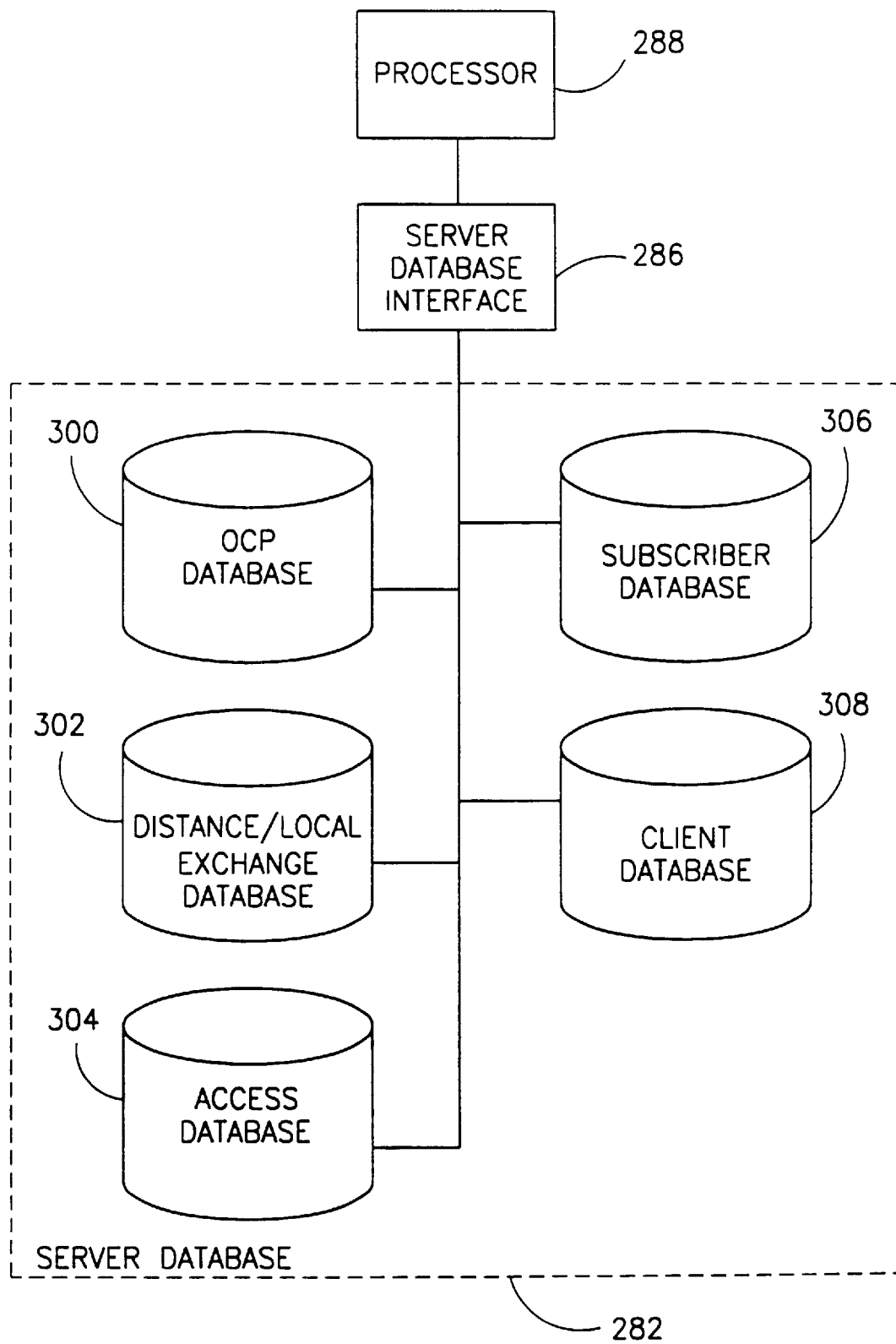
FIG. 10 is a detailed block diagram illustrating the server database portion of the tariff data server.

Server database interface 286 couples processor 288 to server database 282. Server database interface 286 handles all database requests from processor and is responsible for the maintenance of server database 282. A more detailed diagram of server database 282, showing the individual databases it comprises, is illustrated in FIG. 10. Server database 282 comprises an OCP database 300, distance/local exchange database 302, an access database 304, a subscriber database 306 and a client database 308. For all databases comprising the server database, server database interface 286 serves as the interface for database requests from processor 288.

With reference to FIG. 10, OCP database 300 contains data on local long distance toll OCPs supported by call management system 250 and covers the following jurisdictions: local intraLATA/intrastate; intraLATA/interstate; interLATA/intrastate; interstate; international (i.e., Canada, Mexico, Hawaii, Puerto Rico); local and overseas. In a preferred embodiment, OCP database 300 includes the following parameters: OCP name, OCP code, carrier code, jurisdiction type, OCP locality, billing method (i.e., mileage, NPA bands, flat rate, etc.), rate data, time of day dependence, day of year dependence, call billing parameters (i.e., initial period rate, overtime period rate), rate period specific (RPS) flag, volume discounts, tapering, discounted countries (i.e., discount percentage—MCI's 'friends and family' OCP), discounted NPAs (i.e., MCI's 'friends and family'), discounted telephone numbers (i.e., MCI's 'friends and family'), prepaid period option, period commitment discount, volume commitment, carrier identity, promotions, optional OCP to be concatenated with (i.e., combineability with volume generated via other types of calls such as other OCPs or 1-800 calls) and validity period.

Distance/local exchange database 302 contains the geographic coordinates (i.e., vertical and horizontal (V & H) data) of all NPA/NXXs. This data enables the calculation of the distances between the calling location and the called destination designated by the NPA/NXX for the purposes of determining if the call is a local or long distance call and to calculate the rate for a long distance call.

Access database 304 contains the following information on a per OCP and geographic basis: availability data, jurisdiction and access method. Availability data includes whether the OCP is available only as a primary long distance carrier, available upon registration as a secondary long distance carrier, available as a casual call (i.e., gypsy) or not available. The access method for each OCP in each NPA may include 10-XXX, 1-950-7D-User Authorization Code (UAC), 1-800-7D-UAC, 1-888-7D-UAC (7D is equivalent to 7 dialed digits).

Subscriber database 306 contains subscriber data, received from the subscriber, and includes the following: subscriber telephone numbers, subscriber's main billing account, subscriber userID, license size (i.e., the number of line units), organization, subscriber contractual OCPs, e-mail address, account number, registration data, last month paid, subscriber name, telephone number, fax number, address, primary carrier including OCP and start date, secondary carriers and related OCPs, associated start dates, subscriber long distance initial volume and monthly volume of credit card calls and 1-800 lines to be summed for volume discount calculation purposes. Means are provided to add/delete/modify subscriber registration data, OCP data and carrier data.

Client database 308 is dynamically derived for each group of subscribers with a common NPA/NXX or for a specific subscriber for their specific region and related data, in accordance with the particular arrangement with the subscriber. The client database provides the necessary data for downloading full or partial databases to subscribers or clients. The data contained in the client database is derived from the other databases and includes information relevant only for that subscriber. The client database includes: a list of all accessible OCPs, the rate step (mileage rings for rate calculation), validity date key and a list of exchanges a call to which is considered a local call. Accessible OCPs are defined as the primary long distance carrier OCP to which the subscriber is registered, other OCPs to which the subscriber registered other than through their primary long distance carrier and all OCPs available at the subscriber location via a casual call (i.e., gypsy) for all other carriers. The rate step comprises three parts: a list of all NPA/NXX to a local call, detailed rate steps for exchanges requiring both NPA and NXX to determine rate step and non-designated NPAs for those NPAs for which the entire NPA is included in one rate step. The validity date key is the latest data for which the client's database is valid.

Figure 11:
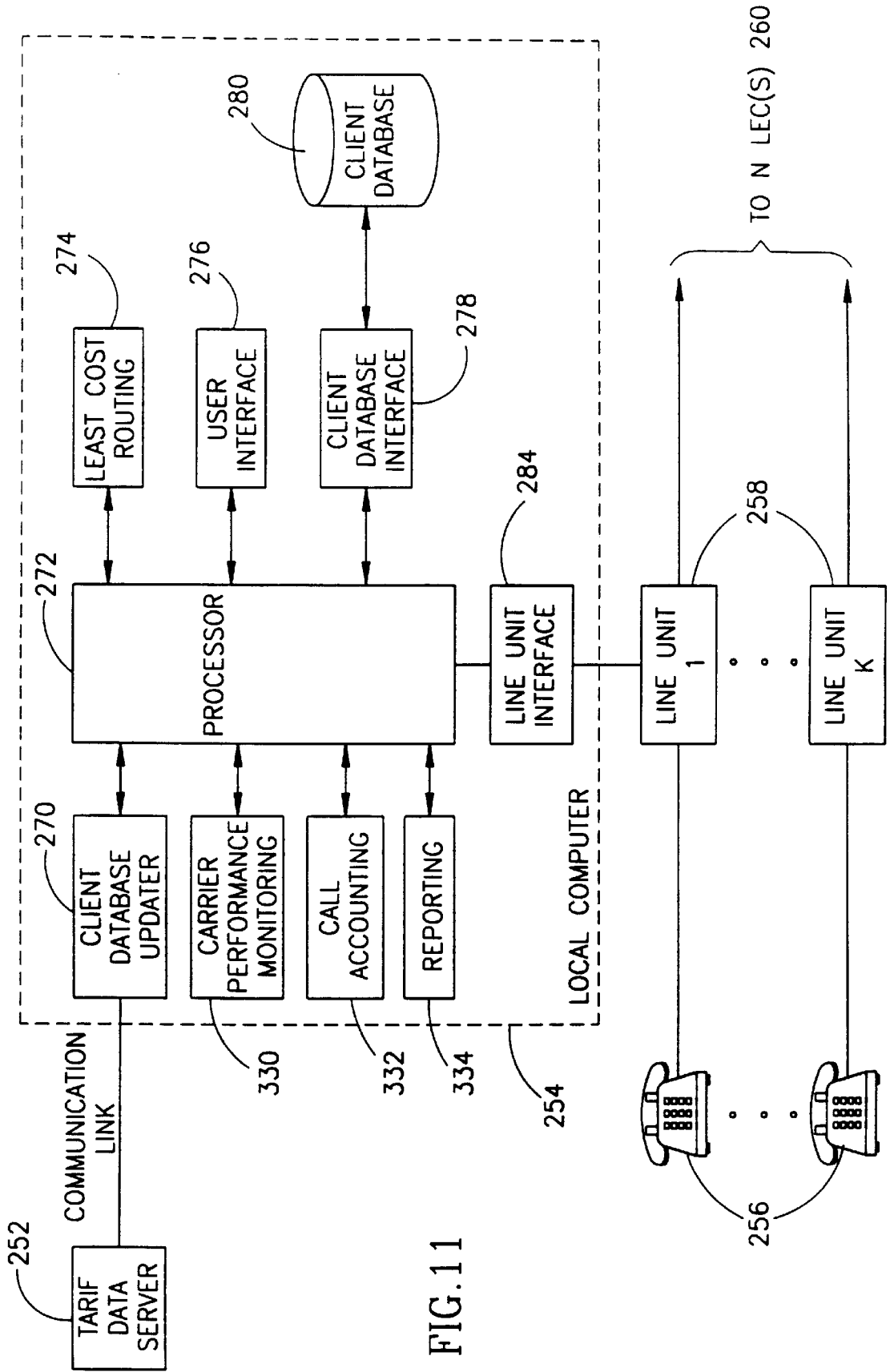
FIG. 11 is a detailed block diagram illustrating the local client computer of the present invention.

Local client computer 254 (FIG. 6) will now be described in more detail. A detailed block diagram of the local client computer is illustrated in FIG. 11. Local client computer 254 comprises a processor 272 coupled to a least cost router 274, a user interface module 276, a client database interface 278, a call accounting module 332, a reporting module 334, a carrier quality and performance monitor 330, a line unit interface 284 and a client database updater 270. The local client computer functions to route a subscriber originated call via the optimum carrier/LEC combination. The optimum route is determined by calculating the expected call price of a call of average duration via all possible OCPs while considering parameters such as performance and quality and then choosing the carrier associated with the optimum call route.

With reference to FIG. 11, client database updater module 270 provides the interface between processor 272 and tariff data server 252. Client database updater 270 receives partial or full database downloads from tariff data server 252 via a suitable method (i.e., e-mail or FTP), decodes the message and updates a client database 280 via client database interface 278. Any commercially available Internet application software package may be used to provide e-mail and FTP functionality. The client database comprises data derived from any or all of the following sources: data downloaded from the tariff data server, data entered by the subscriber or data collected locally.

The data downloaded from the tariff data server has been previously described. The data entered by the subscriber comprises, but is not limited to, the subscriber's name, subscriber's telephone number, main account number, primary carrier and OCP, secondary carriers and OCPs, number of trunks or telephone lines, telephone numbers 1 through N including central office (CO) lines or PBX trunks/extensions and the corresponding PBX access code (if needed) for each telephone number, number of line units installed at the site, line unit ID number for line units 1 through K, ignored prefix numbers, preferred country if OCP selected, preferred NPA if OCP selected, preferred destination if OCP selected, initial long distance call volume, 1-800 normal volume, credit card normal call volume, long distance companies prohibited from being used by subscriber, length of log file and whether on-line display is required. The data collected locally is accumulated via call accounting module 332. Call accounting module 332 functions as a set of meters and provides data necessary for least cost router 274. The meters provide monthly accumulated cost per OCP and, on a per jurisdiction basis, average call length, and a call length distribution table and call establishment duration. In addition, call accounting module 332 functions to log subscriber call data for the generation of periodic reports and to calculate subscriber call characteristics required for least cost router 274. A call distribution profile is maintained based on past calling history. The call distribution data and its effect on call pricing are used in estimating the cost of the call. For example, an average call of 1.5 minutes would be cheaper using a more expensive carrier that bills using 6 sec/6 sec billing rather than a less expensive carrier that bills using 60 sec/60 sec billing. A user making many short duration calls, for example 10–15 seconds, would prefer 6 sec/6 sec billing over 60 sec/60 sec billing.

For embodiments of the present invention coupled to a PBX, local computer 254 may receive call accounting data directly from the PBX via local interfaces, in addition to or in place of the call accounting data collected by call accounting module 332, since many modern PBXs have call accounting functionality built-in.

Other data collected locally includes data output from carrier performance monitor 330. Since using call management system 250 is likely to encourage the use of small carriers, the performance of the established call connection may vary from call to call for different carriers. The quality and performance of a carrier is measured by the percentage of established calls, the time to call establishment and the voice quality of the transmission line. Percentage of established calls means calls established upon the first attempt. Voice quality is measured by the subscriber, using the telephone set. If the subscriber is not satisfied with the voice quality of the call, a digit sequence, such as 'BAD', may be entered to flag the call as having poor quality. System 250 collects quality and performance related data associated with each call to be able to monitor a carrier's quality and performance. The following data is collected on a automatic basis with no intervention required from the subscriber. All calls which have not been established due to one of the following reasons will be recorded: lack of ring tone or a busy tone, congestion tone (i.e., fast busy) detected or the call duration was for less than a predetermined minimum. In addition, data collected on a manual basis includes all calls the subscriber flags as 'bad' (i.e., poor quality of connection due to noise, etc.). To avoid the usage of bad quality carriers, once a carrier is first flagged either automatically or by the subscriber, calls will be routed to the second least cost carrier. After a predetermined number of flaggings within a finite time, the carrier will be suspended for a period of time. After a certain number of suspensions within a week, the carrier will be suspended for a week and the user notified accordingly.

In addition to collecting and processing carrier performance data using carrier performance monitor 330, processor 272 may receive carrier performance data from tariff data server 252. The tariff data server may collect its own carrier performance data and make this data available to local computer 254 via downloading.

User interface 276 functions to provide setup screens for entering and updating subscriber supplied parameters. The data entered by the subscriber comprises the subscriber's name, address, organization, user ID, license size (i.e., number of line units) including serial numbers, monitored telephone numbers, e-mail address, main account number, primary carrier/OCP including start date, secondary carrier/OCPs numbered 1 through N including start date, initial long distance call volume, normal 1-800 call volume, normal credit card call volume, registration date, preferred telephone, NPA, country, contact telephone number, contact facsimile number. In addition, user interface 276 displays a call progress report which includes the following information: last used OCP, call destination (telephone number and text), cost and savings for the current and last call.

Reporting module 334 functions to generate the following reports: a savings report, a call accounting report and an unsuccessful call report. The savings report specifies the saving achieved by using the call management system compared to using the default carrier which is the primary inter-exchange carrier (PIC) (i.e., if the call management system was not used). The savings report shows the total saving last month, accumulated saving since the call management system was installed and the calls routed by carriers other than the default (PIC) and the saving for each call for the last month. The call accounting report includes the details of successful calls. The calls are grouped by OCP and appear in calendar order. The call accounting report shows the called destination number, destination city, date, time of day, duration, cost and associated line unit. Various queries may be made to view various call accounting information. The unsuccessful call report is typically used by a subscriber to inhibit usage of low performance and low quality carriers. This report enables monitoring of the grade of service among competitive carriers. The report includes the details of calls which have not been completed due to congestion or no detection of ring or busy tone after digits are dialed. Calls on this report are grouped by carrier. Each entry in the report includes called destination number, destination city, data, time of day, call duration and line unit in use.

Line unit interface 284, coupled to processor 272, functions to provide the interface between processor 272 and the one or more line units 258 installed in the system. Both wired and wireless communication links are supported by line unit interface 284. To support a wired link, line unit interface 284 comprises a conventional RS-232 interface, well known in the art. For wireless links, line unit interface 284 comprises a suitable conventional wireless link such as RF or infrared, also well known in the art. Each line unit interface 284 maintains a communications link with each of the line units in the system.

Least cost router 274, as described previously, determines, for each call, the least cost carrier/OCP and provides to the line unit the necessary access dialing string along with the number to dial. The input parameters to the least cost router are the following: basic rates including initial period and additional period, caller location (i.e., what carriers and what calling plans are available in the caller's location and what exchanges are considered local), destination mileage and resulting rate steps, billing scheme including initial period duration and additional period, call jurisdiction (i.e., local call, intraLATA, interLATA/intrastate, interstate, international), billing scheme (i.e., mileage dependent, flat rate, band), date and time of day dependency, day of week/year dependency, expected call duration, statistics of call duration (i.e., caller's calling habits), volume discounts, aggregate volume discount for all lines associated with the same main billing account (MBA), volume and discount commitment, promotions in effect, block of time (i.e., a certain amount of time is at a reduced rate during a discount period, e.g. AT & T's Reach Out America calling program), prepaid or free volume, volume commitments, concatenated OCPs for volume discount calculation, taper (i.e., different price for different level of consumption) and discounted countries, area codes, telephone numbers (e.g., MCI's 'friends and family' OCP, Sprint's 'Most'), free day dialing, discounted country, NPA, 1-800 normal volume, credit card call normal volume. Some calls are not modified by the LCR mechanism and are returned to the line unit as dialed. For example numbers with a non-legal NPA, unsupported country codes and NPA/NXXs for which no rate table exists (i.e., 1-800, 1-900, emergency services, collect calls, etc.).

Processor 272 executes one or more ongoing client processes within the local client computer. A call process in the processor is a real time event driven process that includes the following: line monitoring, digit collection and analysis, least cost routing process, line unit interface, call progress display and call logging. Line monitoring is active during all the phases of a call and includes the monitoring of all line units in the system. The line monitoring process receives telephone line status information from each line unit, arranges the data according to line unit and receives the status of each line unit itself, thus obtaining information on all dialed digits and on call start and end information. It maintains communications with each line unit and periodically sends 'keep alive' messages to each line unit. In addition, dialed digits are collected during the call and are reported to the call logging process.

The digit collection and analysis is evoked by the telephone set going off-hook. Once dialed, the call progress display dynamically updates the following information for the user or subscriber: the dialed number, destination city, carrier's identity, call progress phase, call duration, call accumulated dynamic cost and call accounting dynamic saving. The call logging process logs calls which have and have not been processed by the least cost router, faulty calls in which no connection was established (i.e., no ring or busy tone, call was too short, congestion tone, the establishment time was too long, call flagged as bad by subscriber, etc.).

In addition to a call process, processor 272 executes time driven processes which include volume calculation per carrier and the carrier quality and performance assessment process, discussed previously. The volume calculation includes calculating the volume of each carrier's OCP on a monthly basis and computing an average. The calculated average volume is used to determine the expected volume per carrier and to recalculate the pointer to the volume discount entry. In addition, a process performed weekly calculates the expected volume according to the following formula:

$$\text{expected volume} = \frac{\text{accumulated volume}}{\text{percentage of the month passed}}$$

Calculating the expected volume helps to eliminate cases where a monthly peak or changes in the usage of a carrier will cause new volumes. If weekly expected volumes differ from the average monthly volume, the appropriate OCPs are updated accordingly. The carrier performance control process decides, on a periodic basis, whether to drop a particular carrier from use. The decision is based on data collected automatically and entered manually by the subscriber, as described previously. In addition, the expiration data of promotions are tracked on a daily basis. The expiration data of each promotion is included in the OCP parameter data.

It is noted that alternative call management system embodiments may be constructed using any combination of least cost routing unit 274, call accounting unit 332 and carrier performance monitoring unit 330. A preferred call management system embodiment, however, comprises all three units: least cost routing unit 274, call accounting unit 332 and carrier performance monitoring unit 330.

Figure 12:
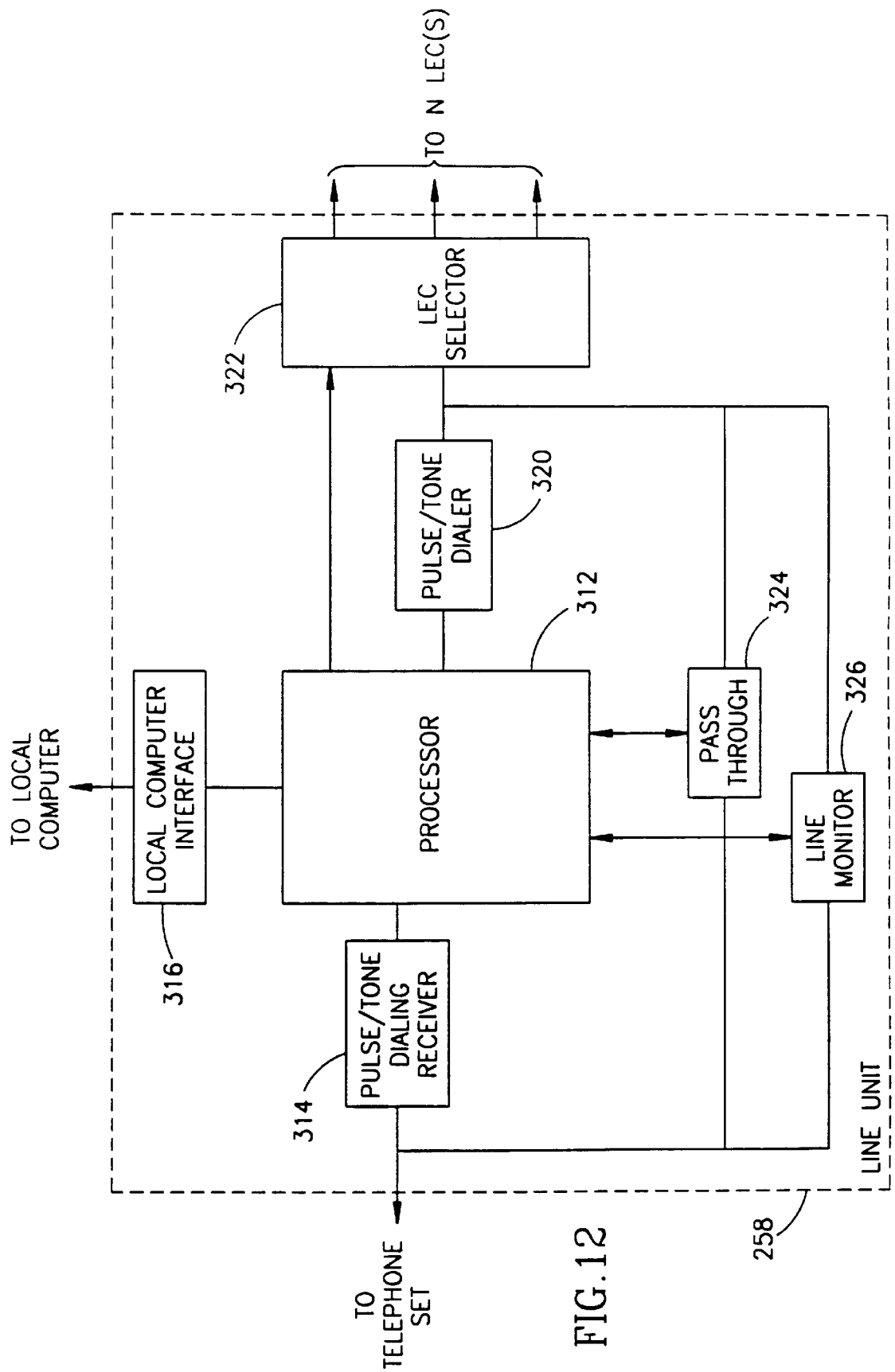
FIG. 12 is a detailed block diagram illustrating the line unit of the present invention.

Line unit 258 will now be described in more detail. The line unit is positioned between the subscriber's telephone set and the telephone network. As previously disclosed, each line unit maintains a communication link to the local client computer. All digits dialed by the subscriber after the telephone goes off-hook are passed to the local client computer. For calls not relevant to the least cost router, the local client computer returns the dialed number to the line unit as dialed. The line unit, in turn, transmits those digits to the telephone network. An example of calls ignored by the least cost router are: 1-800 calls, 1-888 calls, emergency services (i.e., 911, etc.) and calls to operators (i.e., 0, 0+, 411, etc.). Illustrated in FIG. 12 is a detailed block diagram of the line unit portion of the call management system. Line unit 258 comprises a processor 312 coupled to a pulse/tone or ISDN dialing receiver 314, a local client computer interface 316, a LEC selector 322, a pulse/tone or ISDN dialer 320, a pass through module 324 and a line monitor 326. Processor 312 functions to control the internal operation of line unit 258. Pulse/tone dialing receiver 314 is coupled to the telephone set and functions to receive and interpret the digits dialed by the subscriber via the telephone set. The intercepted digits are sent to processor 312 further handling. Local client computer interface 316 is adapted to provide a wired or wireless communication link to the local client computer. For wired links, local client computer interface may implement a standard RS-232 interface or any other PC interface such as parallel I/O, Universal Serial Bus (USB), PC bus extension such as PCI, all of which are well known in the art. If a wireless link is used between the line unit and the local client computer, a standard RF or infrared communication link is implemented, also well known in the art. The line unit interface 284 (FIG. 11) in the local client computer is adapted to handle multiple line units by implementing a protocol similar to carrier sense multiple access with collision detection (CSMA/CD), the scheme used in standard Ethernet networks.

Pulse/tone or ISDN dialer 320 is coupled to processor 312 and receives strings of digits to be dialed onto the telephone line. Pulse/tone or ISDN dialer 320 is coupled to LEC selector 322. LEC selector 322 couples the output of pulse/tone or ISDN dialer 320 to one or more LECs. A control signal from processor 312 determines which LEC the output of pulse/tone or ISDN dialer 320 is coupled to. The telephone line from the LEC, via LEC selector 322, is also coupled to pass through 324 which functions to become transparent when line unit 258 is not active (i.e., powered down). The default state of pass through 324 is to act transparent to the line. In this state, digits dialed by a subscriber are passed transparently through to the telephone line. The state of pass through 324 can be controlled via processor 312.

Line monitor 326, coupled between the telephone set and the telephone line, functions to monitor the telephone line on both sides of the pass through at all times. When an off-hook condition and subsequent dial tone signal is detected on the line, processor 312 opens up pass through 324, disconnecting the telephone set from the telephone network and sends an 'off-hook' signal to the local client computer. The line monitor monitors the line and transfers network signals to the telephone set. All digits dialed will be captured by pulse/tone or ISDN dialing receiver 314, prevented from being transmitted on the telephone line and reported to the local client computer until a connect command is received. Upon receipt of a connect command, processor 312 puts pass through 324 into the transparent state, coupling the telephone set to the telephone network. After a connect line command is received, line monitor listens for the following events and responds with an associated action: call answered (i.e., the called party answered the call)—a 'voice' message is sent to the local client computer; a dial tone cadence—a 'dial tone' message is sent to the local client computer; a ring cadence—a 'ring' message is sent to the local client computer; a busy cadence—a 'busy' message is sent to the local client computer; a congestion cadence—a 'congestion' message is sent to the local client computer. The above list is only presented as an example, other tones may also be included depending on the application.

Figure 13:
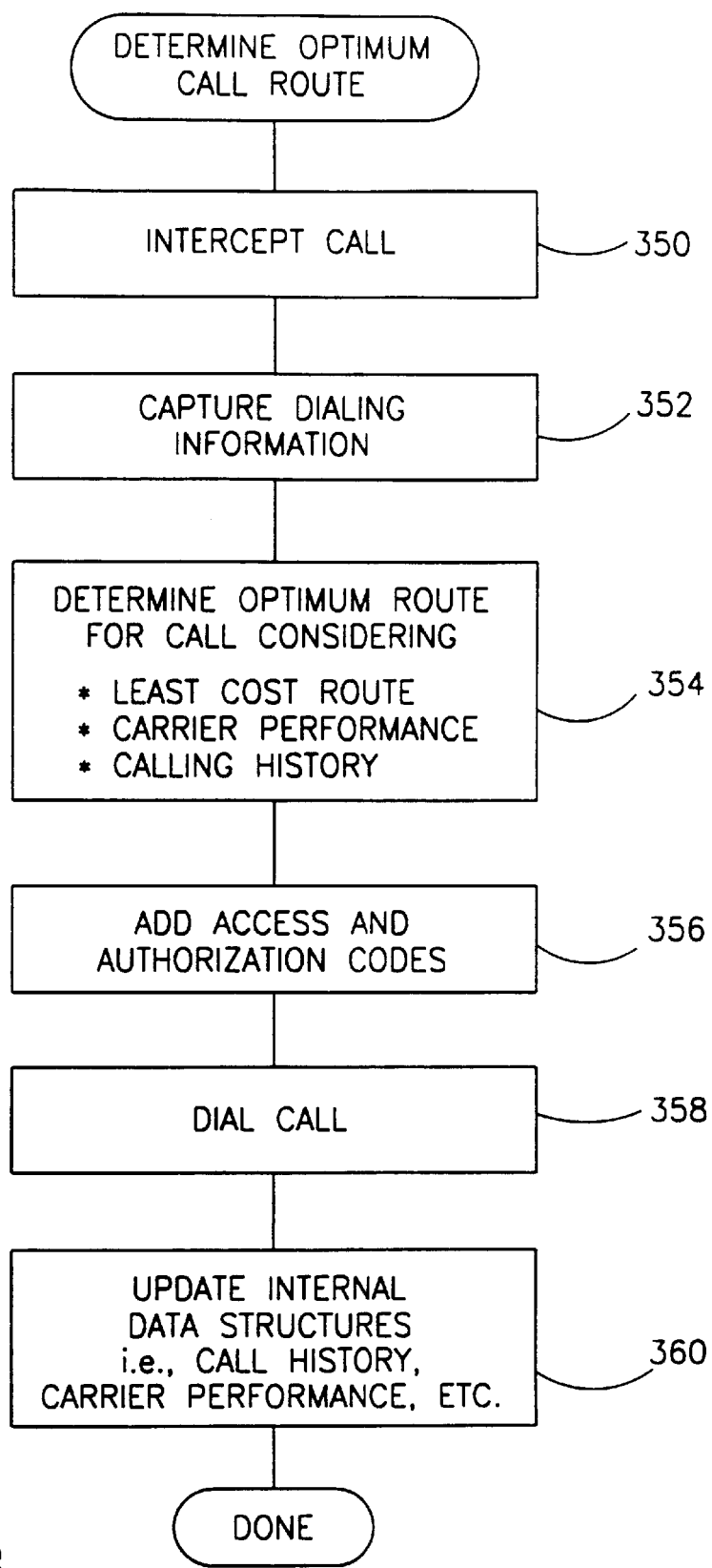
FIG. 13 is a flow chart illustrating a method of real time call routing using the call management system of the present invention.

A flow chart illustrating a method of real time call routing using the call management system of the present invention is shown in FIG. 13. Although each step of the process has been previously disclosed in detail above, the flow chart illustrated in FIG. 13 is never the less useful in understanding the method of the present invention. First, the call dialed by the user is intercepted either by PBX 120 (FIG. 2) or line unit 258 (FIGS. 6 to 8) (step 350). The dialing information input by the user is captured and stored (step 352). Then, the optimum route or path for the call is then determined (step 354). Either any or all of the following factors may be factored into the decision as to with which carrier to place the call: (1) least cost route for the call, (2) locally derived or downloaded carrier performance data or (3) the calling history of the user. After the optimum call is determined, any access and/or authorization codes are added to the dialed string (step 356). The call is then dialed (step 358). Internal data structures are then appropriately updated to take into account the call just dialed (step 360).

Figure 14:
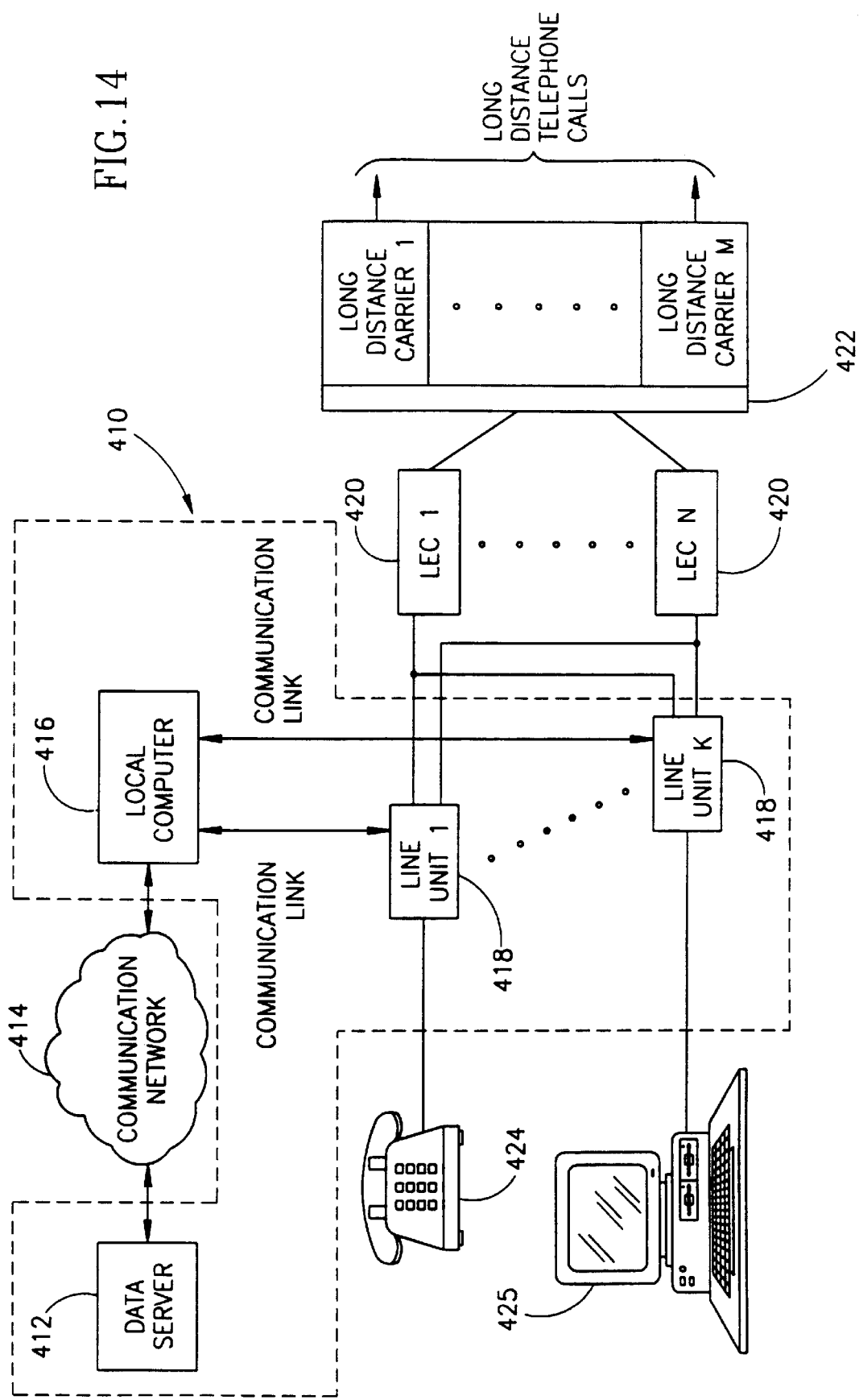
FIG. 14 is a block diagram illustrating the call management system constructed and operative in accordance with a preferred embodiment of the present invention coupled to a telephone and a computer.

A high level block diagram of an example of a call management system constructed in accordance with a preferred embodiment of the present invention is illustrated in FIG. 14. The call management system, generally referred to by reference numeral 410, comprises a data server 412, a local client computer 416 and one or more line units 418. System 410 interfaces to analog lines such as those commonly used with residential and business telephone service. Data server 412 holds tariff and subscriber related data. The tariff information comprises data on different carriers including both local and long distance telephone companies. The tariff data covers different tariff schemes available from each telephone company at each locality. The tariff data is downloaded to local computer 416 either periodically or according to another schedule such as upon a modification to a tariff schedule. Data server 412 is coupled to local computer 416 by a communication network 414. The communications network may include any suitable type of network or communication link such as a pair of modems over an ordinary telephone line, leased or private line, the Internet, local area network (LAN), wide area network (WAN), bulletin board service (BBS), etc.

Any number of line units 418, labeled 1 through K in FIG. 14, are installed between a telephone set 424 and the public telephone network. In addition to telephone set 424, line units 418 may be coupled to one or more personal computers 425 with telephone dialing capabilities (i.e., attached fax/modem cards). Note that the line units are also capable of being connected to facsimile equipment and modems in addition to telephones and computers. The public telephone network is represented by one or more Local Exchange Carriers (LECs) 420 labeled 1 through N. Each LEC, in turn, is coupled to one or more long distance carriers 422 labeled 1 through M. Long distance telephone calls made by a subscriber are placed by one of N long distance carriers 422. Each line unit 418 communicates with local client computer 416 via a communications link. The communications link may be wired or wireless (i.e., RF, infrared, etc.) and is a bi-directional communications channel. When a call is placed, one of the line units 418 intercepts digits dialed by the subscriber through coupled telephone set 424, determines the optimum route for the call using the carrier selection table and generates a translated dialing string. The translated dialing string is dialed directly by the line unit 418. In a preferred embodiment, each line unit 418 is able to connect to any number of N LECs. When more than one LEC is available, the line unit, using the carrier selection database, determines the optimum LEC, in addition to the optimum long distance carrier, and steers the call to that LEC.

Local computer 416 receives the tariff database from the data server 412 and customizes it for use by the line unit. Local client computer 416 is a personal computer (PC) or other suitable computing means which also functions to process call history and call accounting data uploaded from the line units The collected data serves as the basis for call accounting, expected volume discount calculations and call savings reports. Note that local client computer 416 can be coupled to more than one line unit 418. Preferably a line unit is coupled to every telephone set in the system. This provides maximum savings by intercepting each call and determining the optimum carrier to place the call through in accordance with the carrier selection database. Each line unit is coupled to local client computer 416 via a wired or wireless communications link. The local client computer, in addition to the line unit and tariff data server, are described in more detail below.

Figure 15:
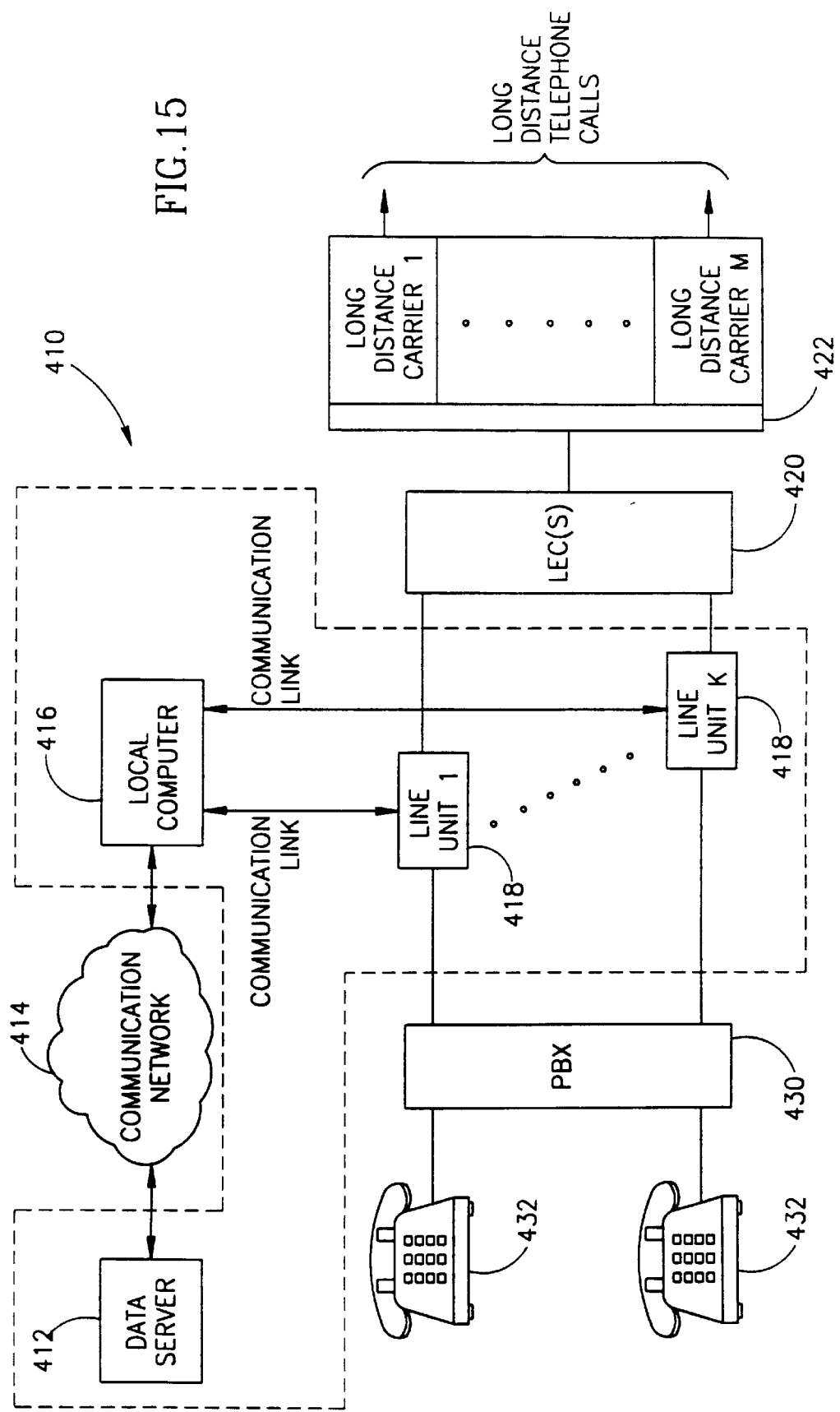
FIG. 15 is a block diagram illustrating the call management system constructed and operative in accordance with a preferred embodiment of the present invention coupled to a private branch exchange (PBX) system.

A block diagram illustrating the call management system constructed and operative in accordance with a preferred embodiment of the present invention coupled to a private branch exchange (PBX) system is shown in FIG. 15. The system shown in FIG. 15 is similar to that of FIG. 14 but highlights the connection of the system to a PBX 430. Coupled to PBX 430 are one or more telephone extension sets 432. Operation of the system 410 in FIG. 15 is identical to that of the system shown in FIG. 14 except that the line units 418 interface to trunks such as those commonly used with small or medium sized office PBX telephone systems. In addition, all line units can be housed in a single unit sharing one common communication channel between that box and the local computer.

Figure 16:
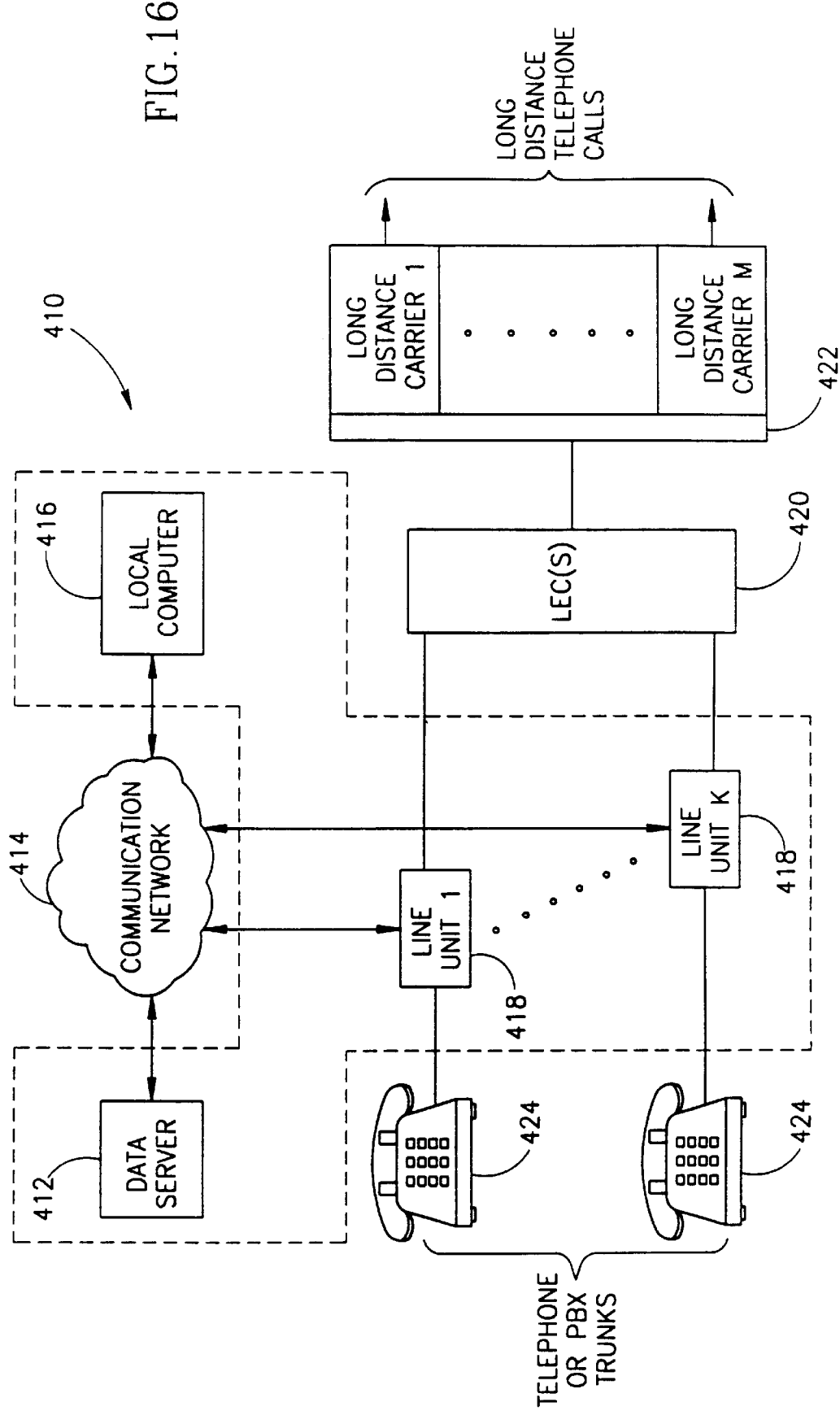
FIG. 16 is a block diagram illustrating the call management system constructed and operative in accordance with a preferred embodiment of the present invention wherein the line units are coupled directly to the communication network.

A block diagram illustrating the call management system constructed and operative in accordance with another preferred embodiment of the present invention wherein the line units are coupled directly to communication network 414 is shown in FIG. 16. In this preferred embodiment, the data server 412, line units 418 and the local computer 416 are all coupled directly to the communication network.

Figure 17:
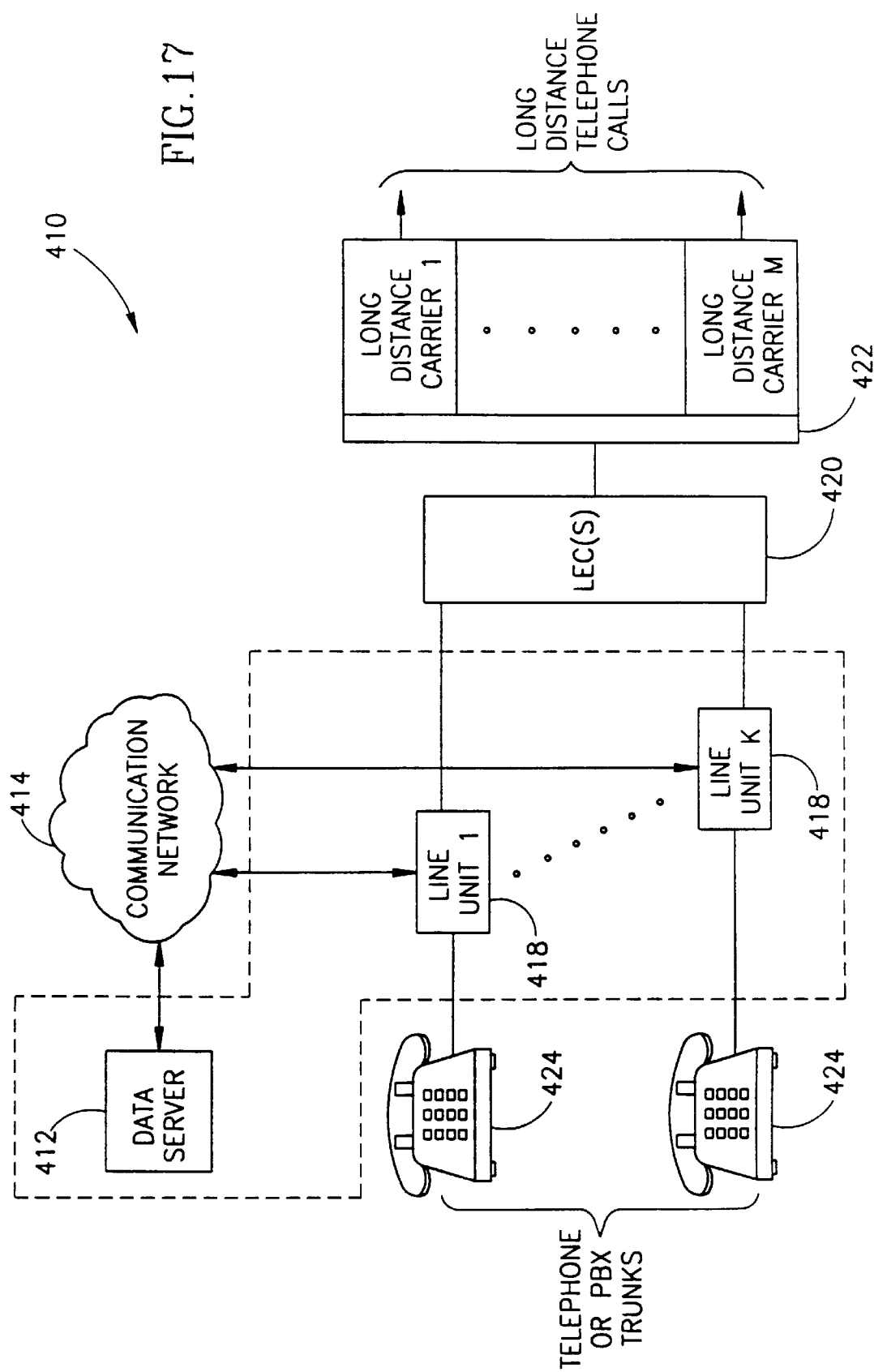
FIG. 17 is a block diagram illustrating the call management system constructed and operative in accordance with a preferred embodiment of the present invention wherein the local computer is eliminated and the line units communicate with the data server through the communication network.

In another preferred embodiment of the present invention, the call management system is constructed without the local computer 416 as illustrated in FIG. 17. In this embodiment, the functions performed by the local computer are performed by the data server 412. The line units operate the same but communicate with the data server through the communication network rather than to the local computer. Thus, the carrier selection database is prepared by the data server and transmitted to the line units through the communication network. The line units upload call accounting information to the data server which analyzes this information in the preparation of the carrier selection database.

The communication network (i.e., the Internet or other suitable network) 414 forms the communication path between tariff data server 412 and the local computer 416. The system can incorporate use of the various standard applications available on the Internet including, but not limited to, electronic mail (SMTP), file transfer protocol (FTP), gopher and the world wide web (WWW). In addition, local computer 416 is coupled to one or more line units 418 via a wireless link (i.e., RF, infrared, etc.).

In this embodiment, the user interface is provided by the data server 412 rather than by the local computer. The user interface on the data server may comprise one or more web pages written using HTTP, the standard language of web sites. A subscriber, using the Internet as the communication network 414, can connect to the data server site to both receive data from and provide data to the data server. Thus, the subscriber's personal data (e.g., negotiated discounts, optional calling plans subscribed to, most dialed area codes, countries and telephone numbers, credits, personal volume or term commitments, etc.) can be directly entered into the data server by the subscriber. Privacy and protection against eavesdropping can be obtained by the data server using an encryption enabled secure web server and subscribers encryption enabled client web browsers.

In the embodiments shown in FIGS. 14 to 17, system 410 is adapted to perform call management for residential/business users or users of a small PBX 430 (FIG. 15). A line unit 418 is associated with each extension in the residential/business system or trunk in the PBX system. Each line unit is coupled to local computer 416 (FIGS. 14 and 15) via a wired or wireless communication link or directly to the communication network (FIGS. 16 and 17) via a communication link. Each line unit is also coupled to one or more LECs 420, which in turn place long distance calls through one or more long distance carriers 422.

Data server 412 will now be described in more detail. Data server 412 comprises a processor, a server database interface, a billing system, a server database, a client communication module, a report generation system and a subscription interface module (not shown). The function of data server 412 is to provide each subscriber with current tariff schedule data, related to geographic location, to allow the call management processes in local computer 416 to determine the optimum route for the call. The data server updates a client database maintained on the local computer with data tailored to the subscribers location and which can also be based on subscriber provided information. Subscriber location is stored according to the numbering plan area (NPA) and the local exchange (NXX).

The data server communicates with the local computer via a communications link. The processor in the data server oversees the operation of the client communications module, which handles all communications between the data server and the local computer. The call management system of the present invention includes an update mechanism to allow a client database to reflect ongoing changes to tariff schedules, carrier's optional calling plans (OCPs), numbering plan changes and changes in the geographic layout of exchanges. Server communications can take place via any suitable means, such as electronic mail (e-mail) or FTP. A subscriber can choose to receive updates in any one of the following ways: per tariff change or periodically. In both cases, either the entire database can be downloaded or only the relevant database transactions need be sent. In addition, the subscriber or client can initiate a database transmission. Either a complete database download or only a portion of it can be downloaded or sent via e-mail to the subscriber. The local client computer then extracts from the download or e-mail message the relevant data and updates its client database.

The billing system, coupled to the processor in the data server, functions to maintain subscriber information needed for billing purposes, if system services are sold on a monthly basis, and to track and update invoices, bills, payments, etc. for all subscribers. The report system functions to generate various types of reports. Reports that pertain to subscriber information, OCP reports and carrier reports are an example of the types of reports available. The subscriber interface receives and processes registration forms containing subscriber data. The data is received either via e-mail, fax, regular mail, etc. and the data processed and entered into the attached server database.

A server database interface couples the processor in the data server to the server database. The server database interface handles all database requests from the processor and is responsible for the maintenance of the server database. The server database comprises a tariff database, distance/local exchange database, a carrier access database, a subscriber database and a client database. For all databases comprising the server database, the server database interface serves as the interface for database requests from the data server processor.

The OCP database contains data on local and long distance toll OCPs supported by the call management system and comprises the call pricing parameter fields listed in the table below. Note that not all fields are populated for all OCPs.

Deterministic Parameters

1. OCP name
2. OCP code
3. carrier code
4. service type: direct dial, credit card call, operator call, information services, emergency, etc.
5. optional OCP to be concatenated with, i.e., combineability with volume generated via other types of calls such as other OCPs or 1-800 and credit card calls
6. validity period -continued 7. tapering
8. rate period specific (RPS) flag
9. time of day (TOD) dependency
10. date, i.e., workday, Saturday, Sunday or Holiday dependency
11. billing method, i.e., mileage banded, flat, NPA (area code banded)
12. billing parameters, i.e., initial period (time and price), additional period (time and price)
13. carrier relations (PIC, subscribed, gypsy/casual)
14. call surcharge
15. availability as a casual/gypsy call
16. casual/gypsy call surcharge: for calls via telephone companies that the customer does not have a subscription to; may vary according to call jurisdiction, e.g., domestic or international
17. term commitment discount (percentage)
18. same telephone owner discount (percentage): origin and destination belong to the same company; for multisite companies
19. same telephone owner discount (fixed amount): origin and destination belong to the same company; for multisite companies
20. preselected telephone numbers discount (e.g., 'friends and family')
21. preselected NPA discount
22. preselected country discount
23. same telephone company discount
24. personal negotiated discount
25. organizations' discount (percentage)
26. special time limited promotions regarding additional discount (percentage) or credit (fixed)

Statistical Parameters 1. retroactive volume discount: can be different for different jurisdictions and the TOD
2. retroactive volume discount limit: some carriers do not give a discount beyond a certain limit
3. precommited volume discount
4. minimum commitment (volume that is paid for regardless of use)
5. prepaid calling volume
6. same telephone company discount
7. post priory most frequently called NPA discount
8. post priory most frequently called numbers discount (e.g., Sprint's 'most')
9. post priory most frequently called country discount The distance/local exchange database contains the geographic coordinates (i.e., vertical and horizontal (V & H) data) of all NPA/NXXs. This data enables the calculation of the distances between the calling location and the called destination designated by the NPA/NXX for the purposes of determining the call jurisdiction.

The access database contains the following information on a per OCP and locality basis (which may or may not be related to NPA): availability data, jurisdiction and access method. Availability data includes whether the OCP is available only as a primary long distance carrier, available upon registration as a secondary long distance carrier, available as a casual call (i.e., gypsy) or not available. The access method for each OCP in each NPA may include 10-XXX, 1-950-7D-User Authorization Code (UAC), 1-800-7D-UAC, 1-888-7D-UAC (7D is equivalent to 7 dialed digits).

The subscriber database contains subscriber data, received from the subscriber, and includes the following: subscriber telephone numbers, subscriber's main billing account, subscriber userID, license size (i.e., the number of line units), organization, subscriber contractual OCPs, e-mail address, account number, registration data, last month paid, subscriber name, telephone number, fax number, address, primary carrier including OCP and start date, secondary carriers and related OCPs, associated start dates, subscriber long distance initial volume and monthly volume of credit card calls and 1-800 lines to be summed for volume discount calculation purposes. Means are provided to add/delete/modify subscriber registration data, OCP data and carrier data.

The client database is dynamically derived for each group of subscribers with a common NPA/NXX or for a specific subscriber for their specific region and related data, in accordance with the particular arrangement with the subscriber. The client database provides the necessary data for downloading full or partial databases to subscribers or clients. The data contained in the client database is derived from the other databases and includes information relevant only for that subscriber or his/her locality. The client database includes: a list of all accessible OCPs, the rate step (mileage rings, according to jurisdiction, for rate calculation) and validity date key. Accessible OCPs are defined as the primary long distance carrier OCP to which the subscriber may register or subscribe to, other OCPs to which the subscriber may or did register to other than through their primary long distance carrier and all OCPs available at the subscriber location via a casual call (i.e., gypsy) for all other carriers. The rate step comprises three parts: a list of all NPA/NXX to a local call, detailed rate steps for exchanges requiring both NPA and NXX to create a rate step and non-designated NPAs for those NPAs for which the entire NPA is included in one rate step. The validity date key is the latest data for which the client's database is valid.

Figure 18:
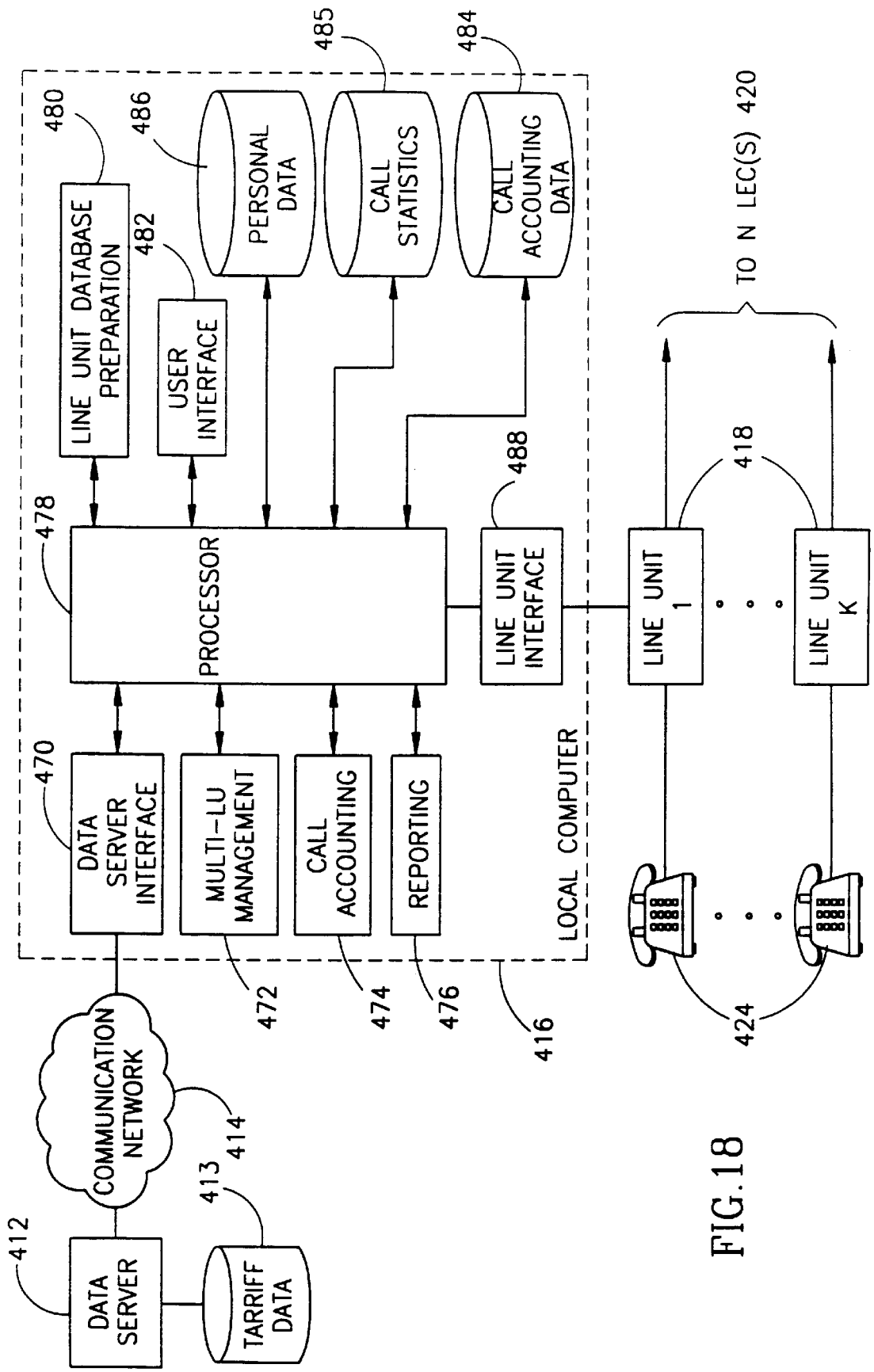
FIG. 18 is a detailed block diagram illustrating the local client computer of the present invention.

A detailed block diagram illustrating the local client computer of the present invention is shown in FIG. 18. Local computer 416 comprises a processor 478 for managing the operation of the local computer. Coupled to processor 478 are a data server interface 470, a multi-line unit (LU) management module 472, a call accounting module 474, a reporting module 476, a line unit database preparation module 480, a line unit interface 488 and a user interface 482. Also coupled to processor 478 are the following databases: a personal database 486, a call statistics database 485 and a call accounting database.

Also shown in FIG. 18 is the tariff database 413, discussed earlier, coupled to data server 412. The data server 412 communicates to local computer 416 via communication network 414 through data server interface 470. The line units 418 communication with the local computer via line unit interface 488.

Figure 19:
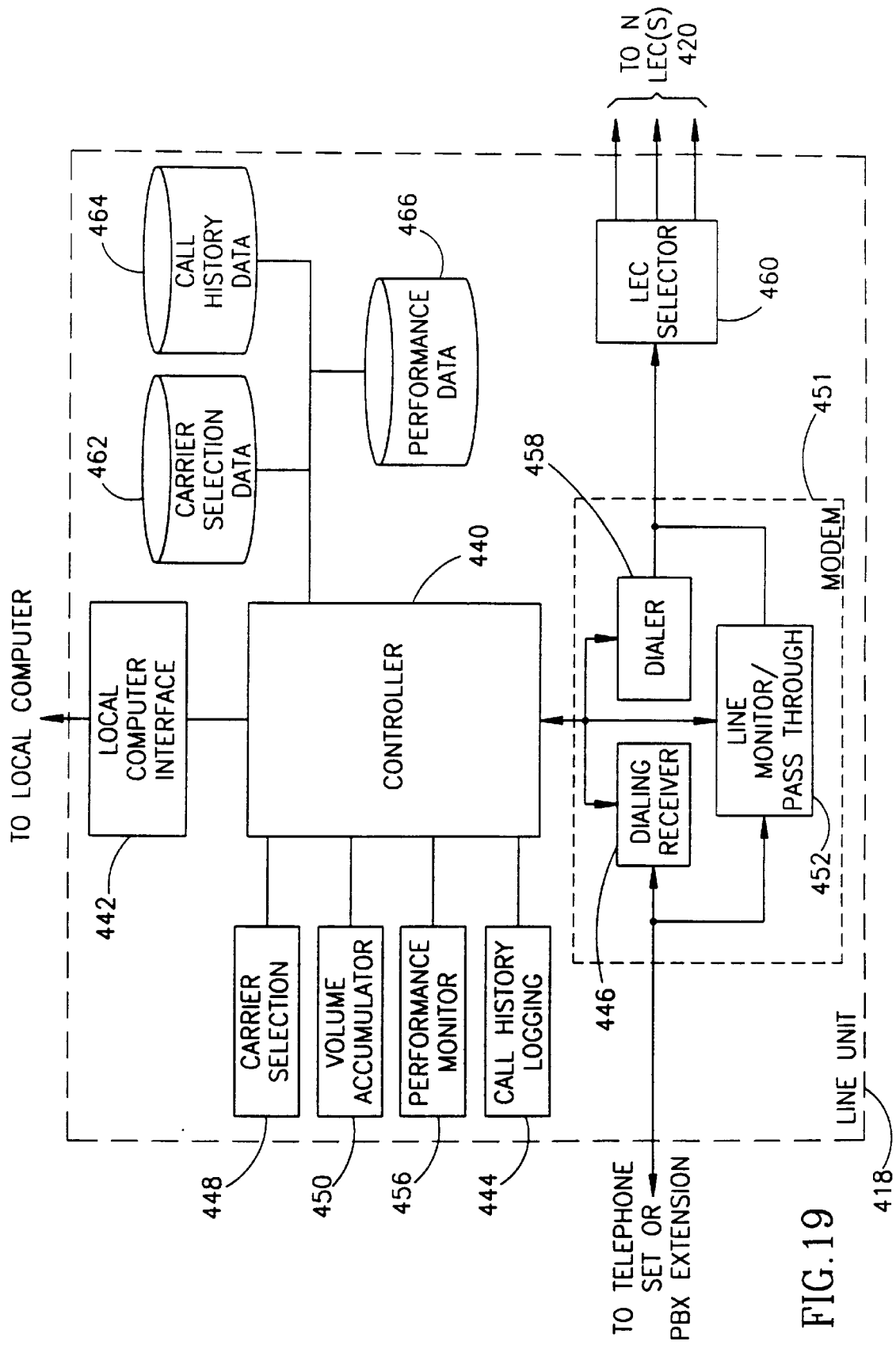
FIG. 19 is a detailed block diagram illustrating the line unit of the present invention.

A detailed block diagram illustrating the line unit of the present invention is shown in FIG. 19. A controller 440 in the line unit functions to manage the internal operation of the line unit. Coupled to controller 440 are local computer interface 442, carrier selection module 448, volume accumulator module 450, performance monitor 456 and call history logging module 444. In addition, controller 440 comprises databases for holding carrier selection data 462, call history data 464 and performance data 466. In addition, the line unit comprises a modem 451. The modem 451 (i.e., modulator/demodulator for data transmission over a voice line) comprises a dialing receiver 446, line monitor/pass through 452 and a dialer 458 are coupled to controller 440. The dialing receiver is coupled to the telephone set or PBX extension. The dialer is coupled to the LECs 420 via LEC selector 460. The line monitor is coupled to both the telephone set and the LEC selector.

The modem in the line unit can function as a conventional external modem for the local computer since it is coupled to both the telephone set and the LEC. The modem can also function to provide Caller ID information to the local computer. The Caller ID information is passed to the local computer via the connection between the line unit and the local computer.

The dialing receiver 446 in the modem is able to decode pulse/tone or ISDN dialing signals. Similarly, the dialer 458 is able to send pulse/tone or ISDN signals. The pulse/tone dialing receiver is coupled to the telephone set or PBX extension and functions to receive and interpret the digits dialed by the subscriber via the telephone set. The line unit interface 488 in the local computer is adapted to handle multiple line units by implementing a protocol similar to carrier sense multiple access with collision detection (CSMA/CD) or any other suitable multiple drop protocol.

The line unit 418 is positioned between the subscriber's telephone set and the telephone network. As previously disclosed, each line unit maintains a communication link to the local computer. All digits dialed by the subscriber after the telephone goes off-hook are intercepted and processes by the line unit. For calls not relevant to the call management system, the line unit returns the dialed number to the dialer as dialed. The dialer transmits those digits to the telephone network. An example of calls ignored by the least cost router are: 1-800 calls, 1-888 calls, 1-900 calls, calls without cost sensitive alternatives, calls for which the destination may not be recognized by the system (e.g., new area codes), emergency services (i.e., 911, etc.) and calls to operators (i.e., 0, 0+, 411, etc.).

Pulse/tone or ISDN dialer 458 is coupled to controller 440 and receives strings of digits to be dialed onto the telephone line. Pulse/tone or ISDN dialer 458 is coupled to LEC selector 460. The LEC selector couples the output of the pulse/tone or ISDN dialer to one or more LECs. A control signal from controller 440 determines which LEC the output of the pulse/tone or ISDN dialer is coupled to. The telephone line from the LEC, via LEC selector 460, is also coupled to pass through 452 which functions to become transparent when line unit 418 is not active (i.e., powered down). The default state of the pass through is to act transparent to the line. In this state, digits dialed by a subscriber are passed transparently through to the telephone line. The state of the pass through is be controlled via controller 440.

Line monitor 452, coupled between the telephone set and the telephone line, functions to monitor the telephone line on both sides of the pass through at all times. When an off-hook condition and subsequent dial tone signal is detected on the line, controller 440 opens up the pass through, disconnecting the telephone set from the telephone network. The user, however, is still able to hear the tones generated by the telephone network. The line monitor monitors the line and transfers network signals to the telephone set. All digits dialed will be captured by the dialing receiver 446 and prevented from being transmitted on the telephone line. Upon determination of the optimum route for the call and dialing the requested number, controller 440 puts pass through 452 into the transparent state, coupling the telephone set to the telephone network. After a connect line command is received, line monitor listens for the following events and responds with an associated action which is processed locally in the line unit: call answered (i.e., the called party answered the call)—a 'voice' message is generated; a dial tone cadence—a 'dial tone' message is generated; a ring cadence—a 'ring' message is generated; a busy cadence—a 'busy' message is generated; a congestion cadence—a 'congestion' message is generated. in the event ISDN is utilized, the appropriate ISDN signals are generated. Note that the above events are processed internally in the line unit and are not reported to the local computer. The above list is only presented as an example, other tones may also be included depending on the application.

In a preferred embodiment of the present invention, the local computer functions as a mediator between the data server and the multiple line units. The actual carrier selection on a call by call basis is not made by the local computer but by each line unit on an individual basis. Carrier data is transmitted from the data server to the local computer via the communication network and processes by the local computer by line unit database preparation module 480. The local computer, in turn, downloads a carrier selection database to each line unit. The line unit then uses the carrier selection database to route a subscriber originated call via the optimum carrier/LEC combination.

With reference to FIGS. 18 and 19, data server interface module 470 provides the interface between processor 478 and data server 412. Data server interface 470 receives partial or full database downloads from data server 412 via a suitable method (i.e., e-mail or FTP). Any commercially available Internet application software package may be used to provide e-mail and FTP functionality. The data that is sent by the data server to the local computer is localized for that particular subscriber's locality. The data comprises rate step information organized by NPA/NXX and other data related to that locality. The localized data stored in the personal database 486 comprises data derived from any or all of the following sources: data downloaded from the data server, data entered by the subscriber or data collected locally via the line unit.

The data entered by the subscriber comprises, but is not limited to, the subscriber's name, subscriber's telephone number, main account number, primary carrier and OCP, secondary carriers and OCPs, number of trunks or telephone lines, telephone numbers 1 through N including central office (CO) lines or PBX trunks/extensions and the corresponding PBX access code (if needed) for each telephone number, number of line units installed at the site, line unit ID number for line units 1 through K, ignored prefix numbers, preferred country if OCP selected, preferred NPA if OCP selected, preferred destination if OCP selected, initial long distance call volume, volume and term commitments, any personal discount, 1-800 normal volume, credit card normal call volume, long distance companies prohibited from being used by subscriber and whether on-line display is required. The data collected locally is accumulated via call history logging module 444 in the line unit and optionally may be uploaded to the local computer to be processed there (e.g., report generation). Call accounting module 474, in the local computer, functions as a set of meters, accumulating volume, and provides data necessary for line unit database preparation module 480. The meters provide monthly accumulated cost per OCP and, on a per jurisdiction basis, average call length, and a call length distribution table and call establishment duration. In addition, call accounting module 474 functions to log subscriber call data for the generation of periodic reports and to calculate subscriber call characteristics required for generation of the carrier selection database 462. A call distribution profile is maintained based on past calling history. The call distribution data and its effect on call pricing arc used in estimating the cost of the call. For example, an average call of 1.5 minutes would be cheaper using a more expensive carrier that bills using 6 sec/6 sec billing rather than a less expensive carrier that bills using 60 sec/60 sec billing. A user making many short duration calls, for example 10–15 seconds, would prefer 6 sec/6 sec billing over 60 sec/60 sec billing.

For embodiments of the present invention coupled to a PBX, local computer 412 may receive call accounting data directly from the PBX via local interfaces, in addition to or in place of the call accounting data collected by call accounting module 474 and logged by call history logger 444, since many modern PBXs have call accounting and call logging (i.e., call reporting) functionality built-in.

Other data collected locally includes data output from the performance monitor 456. Since using the call management system of the present invention is likely to encourage the use of small carriers, the performance of the established call connection may vary from call to call for different carriers. The quality and performance of a carrier is measured by the percentage of established calls, the time to call establishment and the voice quality of the transmission line. Percentage of established calls means calls established upon the first attempt. Voice quality is measured by the subscriber, using the telephone set. If the subscriber is not satisfied with the voice quality of the call, a digit sequence, such as 'BAD', may be entered to flag the call as having poor quality. System 410 collects quality and performance related data associated with each call to be able to monitor a carrier's quality and performance. The following data is collected on a automatic basis with no intervention required from the subscriber. All calls which have not been established due to one of the following reasons will be recorded: lack of ringback tone or a busy tone, congestion tone (i.e., fast busy) detected or the call duration was for less than a predetermined minimum. In addition, data collected on a manual basis includes all calls the subscriber flags as 'bad' (i.e., poor quality of connection due to noise, etc.). To avoid the usage of bad quality carriers, once a carrier is first flagged either automatically or by the subscriber, calls will be routed to the second least cost carrier. After a predetermined number of flaggings within a finite time, the carrier will be suspended for a period of time. After a certain number of suspensions within a week, the carrier will be suspended for a week and the user notified accordingly.

In addition to collecting and processing carrier performance data using performance monitor 456, processor controller 440 may receive carrier performance data from data server 412 via the local computer 416. The data server may collect its own carrier performance data and make this data available to the local computer via downloading.

User interface 482 functions to provide setup screens for entering and updating subscriber supplied parameters. The data entered by the subscriber comprises the subscriber's name, address, organization, user ID, license size (i.e., number of line units) including serial numbers, monitored telephone numbers, e-mail address, main account number, primary carrier/OCP including start date, secondary carrier/OCPs numbered 1 through N including start date, initial long distance call volume, normal 1-800 call volume, normal credit card call volume, registration date, preferred telephone, NPA, country, contact telephone number, volume and term commitments, contact facsimile number. In addition, the user interface displays a call progress report which includes the following information: last used OCP, call destination (telephone number and text), cost and savings for the current and last call.

Reporting module 476 functions to generate the following reports: a savings report, a call accounting report and an unsuccessful call report. The savings report specifies the saving achieved by using the call management system compared to using the default carrier which is the primary inter-exchange carrier (PIC) (i.e., if the call management system was not used). The savings report shows the total saving last month, accumulated saving since the call management system was installed and the calls routed by carriers other than the default (PIC) and the saving for each call for the last month. The call accounting report includes the details of successful calls. The calls are grouped by OCP and appear in calendar order. The call accounting report shows the called destination number, destination city, date, time of day, duration, cost and associated line unit. Various queries may be made to view various call accounting information.

The unsuccessful call report is typically used by a subscriber to inhibit usage of low performance and low quality carriers. This report enables monitoring of the grade of service among competitive carriers. The report includes the details of calls which have not been completed due to congestion or no detection of ring or busy tone after digits are dialed. Calls on this report are grouped by carrier. Each entry in the report includes called destination number, destination city, data, time of day, call duration and line unit in use.

Line unit interface 488, coupled to processor 478, functions to provide the interface between the processor and the multiple line units 418 installed in the system. Both wired and wireless communication links are supported by the line unit interface. To support a wired link, the line unit interface comprises a conventional RS-232 interface, well known in the art. For wireless links, the line unit interface comprises a suitable conventional wireless link such as RF or infrared, also well known in the art. Each line unit interface maintains a communications link with each of the line units in the system.

The carrier selection database is generated in the local computer by the line unit database preparation module 480, downloaded to each line unit and stored in carrier selection database 462. The carrier selection module 448 in the line unit determines for each call, using the carrier selection database, the optimum route and provides to the dialer the necessary access dialing string prefix along with the number to be dialed. The input parameters to the line unit database preparer comprise the parameters in the table presented above and include both the Deterministic and Statistical Parameters listed. In addition, the following parameters are used by the line unit database preparer in constructing the carrier selection table.

Additional Parameters Used To Construct Carrier Selection Database 1. anticipated call duration
2. call duration statistical distribution
3. volume accumulated from separate telephone lines that are combined into one account
4. call volume accumulated for a volume discount (e.g., 1-800, credit card calls, cellular, etc.)
5. taper (i.e., different price for different level of consumption)
6. discounted countries predicted according to call history data (e.g., Sprint's 'Most')
7. discounted area codes predicted according to call history data (e.g., Sprint's 'Most')
8. discounted telephone numbers predicted according to call history data Some calls are not modified by the line unit and are dialed as is. For example numbers with a non-legal NPA, unsupported country codes and NPA/NXXs for which no rate table exists (i.e., 1-800, 1-900, emergency services, collect calls, etc.

Figure 20:
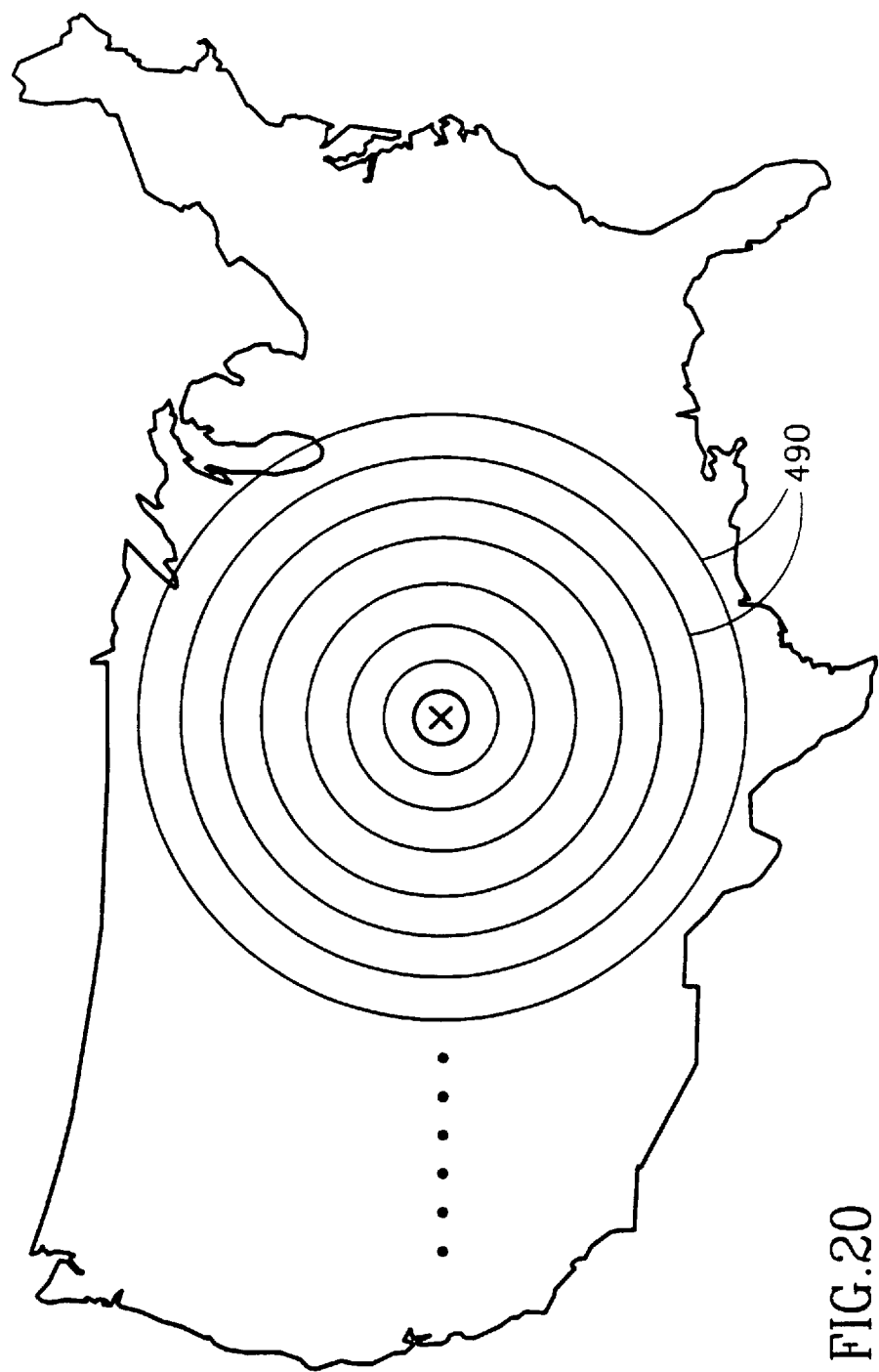
FIG. 20 is a diagram illustrating the rate step zones centered around an arbitrary geographic location.

As described above, the line unit determines the optimum route for each call dialed. Dialing strings are received by the dialing receiver and an optimum route is determined by the line unit and out dialed by the dialer. Once the carrier selection database is downloaded into the line unit, no further action on the part of the local computer is necessary for calls to be optimally routed. Given sufficient processing power and memory, the line unit could determine the optimum route, taking into account all the various parameters listed in the tables above, for the call using the tariff database sent by the data server. This database comprises the raw tariff data organized by location, OCP and distance. However, a line unit capable of processing the raw tariff data, using processor's available today with a sufficiently large memory size, would not be cost effective. If less powerful but cost effective processors are used, prohibitively large processing delays result. Thus, in order to reduce the processing overhead that must be performed by the line unit an abridged version of the tariff database is downloaded to the line unit, called the carrier selection database. This database is organized by rate steps originating from the subscribers location. A diagram illustrating the rate step zones centered around an arbitrary geographic location is shown in FIG. 20. Each ring 490 represents the border between two rate steps. Note that different jurisdictions (i.e., IntraLATA, Interstate, etc.) constitute a different rate step. The area between two rings represent a zone having a constant tariff rate within the same jurisdiction. The rate steps are chosen so that each carrier's rate step is represented. Since not all carrier's have the same rate step organization, the rate steps used to construct the carrier selection database are typically finer than those of any one carrier.

The database that is sent from the data server to the local computer comprises entries for each NPA/NXX in the country (using the United States as an example) and for each foreign country where the NPA is '011' and the NXX represents the country code. This amounts initially to over 100,000 entries. For each entry the tariff to every other NPA/NXX is listed. Line units comprising inexpensive processors and memories to reduce cost would generate unacceptable delays in determining the optimum route for each call. Thus, the number of entries in the database is significantly reduced, for a typical NPA/NXX, by organizing all destination NPA/NXXs by rate step. In some locations, entire NPAs or at least a large portion thereof are included within a single rate step, thus obviating the need to list each NXX separately. The space between each rate step ring 490 represents an area of equal tariff rate on a carrier basis. Each carrier sets their own tariff rate for each rate step.

International and overseas calls are handled in a similar fashion. Each country is assigned its own rate step in accordance with its country code. In this way international calls are handled similarly to domestic calls.

A pseudo code listing illustrating the logic flow of the process of constructing the carrier selection table in the local computer which is subsequently downloaded to the line units is presented below.

---
Generation of Carrier Selection Table
---

```
FOR each type of day {
    FOR each rate step {
        get list of all relevant carrier OCPs
        IF there is a volume commitment or prepaid volume not yet met
        {
            give that carrier first priority in the carrier selection table
        }
        ELSE IF non-specially discounted number {
            FOR each hour {
                FOR each OCP {
                    1. calculate call price as a function of [rates,
                        minimum period, additional period, expected call
                        duration (function of rate step and TOD), call
                        duration distribution (function of rate step and
                        TOD), expected volume discount, term discount,
                        personal discount]
                    2. arrange carrier OCPs in a descending selection
                        order
                    3. insert into carrier selection table
                }
            }
        }
```

---
Generation of Carrier Selection Table
---
-continued

```
        ELSE IF specially discounted number {
            FOR each hour {
                FOR each OCP {
                    1. calculate call price as a function of [rates,
                        minimum period, additional period, expected call
                        duration (function of rate step and TOD), call
                        duration distribution (function of rate step and
                        TOD), expected volume discount, term discount,
                        personal discount, special discount]
                    2. arrange carrier OCPs in a descending selection
                        order
                    3. insert into carrier selection table
                }
            }
        }
    }
}
```

As described above, the line unit database preparation module in the local computer constructs the carrier selection database. The database itself is organized first by type of day (e.g., weekday, weekend, holiday, etc.). For each type of day, the data is organized by rate step. For each rate step the cost for each OCP is calculated according to the hour of the day. The factors that are utilized in determining the cost of each OCP is outlined in the pseudo code listed above. Once the cost is determined for each OCP, the OCPs are placed in the carrier selection database ordered by increasing cost.

Using this scheme, the processing overhead required by line unit on a call by call basis is greatly reduced. The process of determining the optimum route for the call, is reduced to a table look up operation which can be performed very quickly. The table lookup involves choosing the a suitable entry in the carrier selection database downloaded into the line unit. If the first entry in the table is not acceptable for some reason (e.g., it is on a 'bad' carrier list) the carrier next in line is picked. Calculations are not necessary and only another table look-up is required.

It is important to note that in addition, to the raw tariff data received from the data server, the line unit database preparation module also utilizes data contained in the personal database 486, call statistics database 485 and call accounting database 484 in constructing the carrier selection database.

Figure 21A:
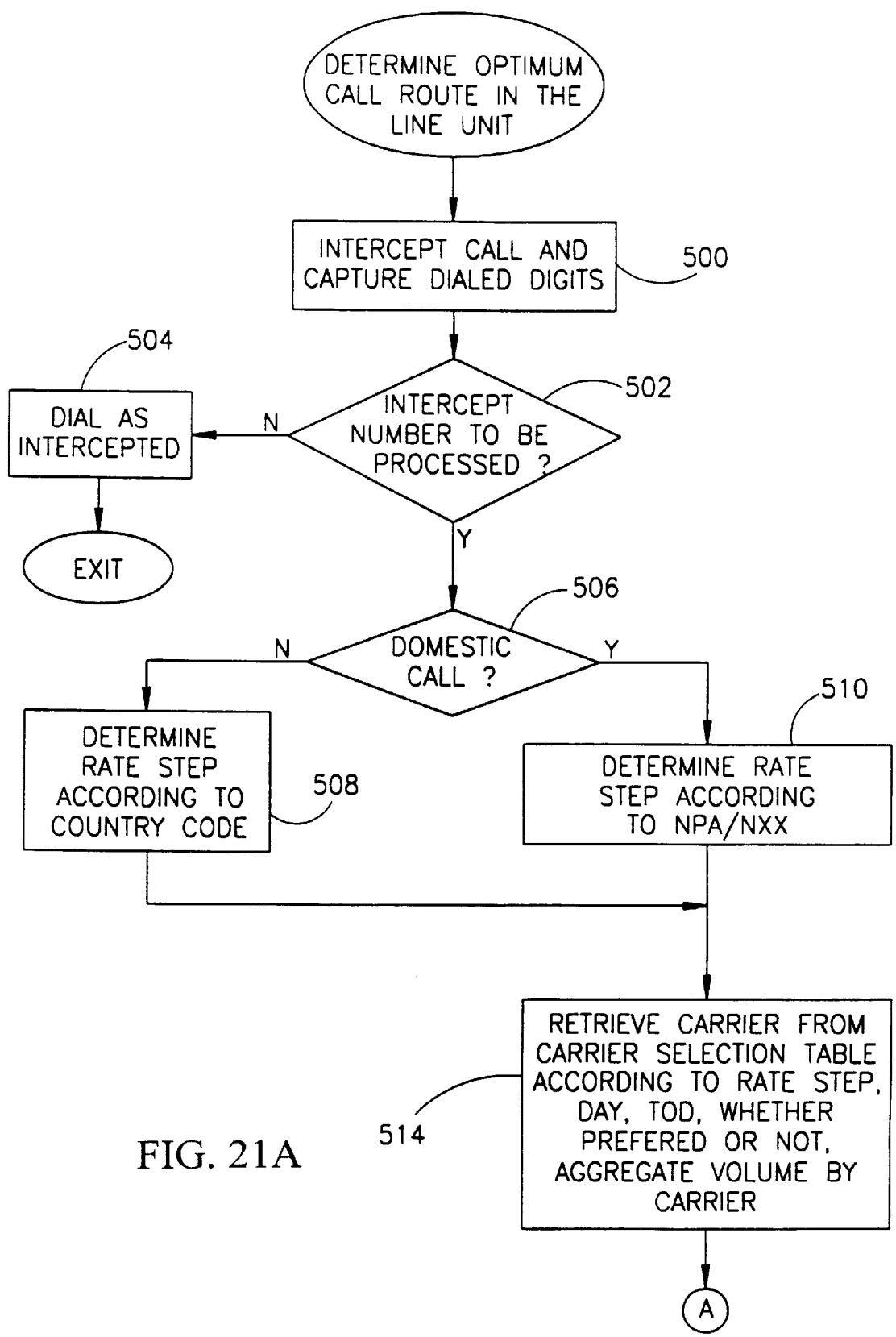
FIG. 21 is a flow chart illustrating a method of real time call routing using the call management system of the present invention.
Figure 21B:
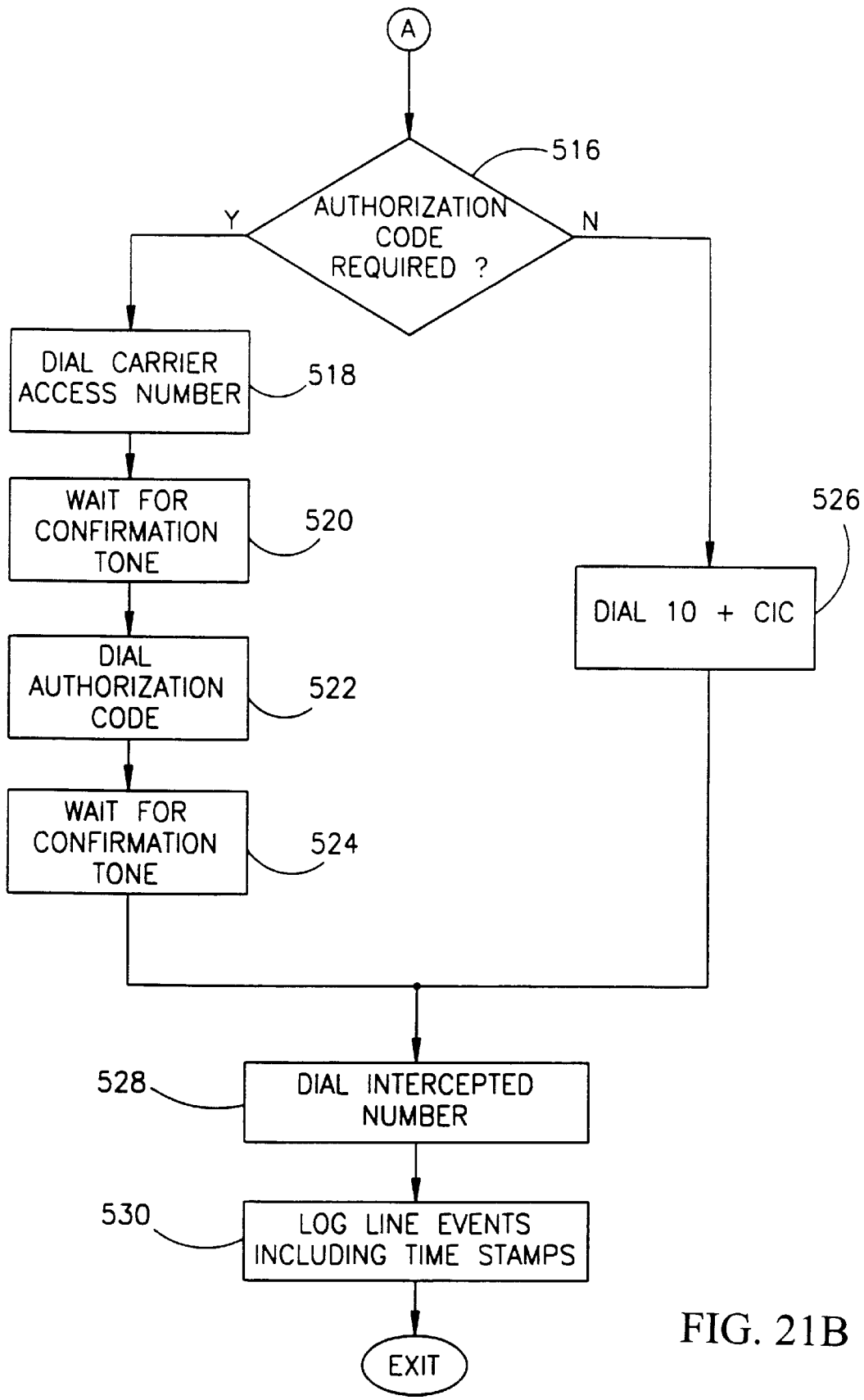

A flow chart illustrating a method of real time call routing using the call management system of the present invention is shown in FIG. 21. This process is performed by each of the line units in the course of processing a call made by a user. First, the digits dialed by the user are intercepted by the dialing receiver 446 (FIG. 19) (step 500). It is then determined whether this is a call that is to processed (i.e., optimized) (step 502). As described above, certain calls are not processed (e.g., emergency services, operator, toll free, etc.). If the call is of the type that is not to be processed it is immediately dialed using the dialer 458 (step 504) and the process terminates.

If the call is to be processed, it is then determined whether the call is domestic or international (step 506). If it is an international call, the rate step is determined according to the country code (step 508). If it is a domestic call, the rate step is determined according to the NPA/NXX (step 510). A table look-up is then performed on the carrier selection database based on the rate step, day of week, time of day, whether or not the carrier is preferred and aggregate volume (step 514).

Once the carrier is selected, it is determined whether the carrier requires an authorization code (step 516). If not, the dialing prefix dialed is simply the '10' (or '101' for new carriers) plus the carrier's ID code (CIC) (step 526). Subsequently, the intercepted number is then dialed (step 528).

If a code is required, the carrier's access number is first dialed as in step 526 (step 518) and then, after a conformation tone is received (step 520), the authorization code is dialed (step 522). After another confirmation tone is received (step 524), the originally intercepted number is dialed (step 528).

After the intercepted number is dialed the line events (i.e., ringing, busy, etc.) are logged by the line unit. These event are optionally periodically transmitted to the local computer for post processing of call data. Each event is also individually time stamped before being processed by the local computer.

Controller 440 (FIG. 19) executes one or more processes within the line unit. A call process is a real time event driven process that includes the following: line monitoring, digit collection and analysis, carrier selection and call logging. Line monitoring is active during all the phases of a call and includes the monitoring of all line units in the system. The multi-LU management module 472 (FIG. 18) in the local computer handles the off-line communications. It downloads the carrier selection database to all line units and uploads call accounting data from each line unit in order to accumulate volume and carrier usage data from each telephone line. The call accounting module 474, receives telephone line status information from each line unit, arranges the data according to line unit and receives the status of each line unit itself, thus obtaining information on all dialed digits and on call start and end information. The local computer maintains communications with each line unit and periodically sends 'keep alive' messages to each line unit.

The digit collection and analysis process in the line unit is evoked by the telephone set going off-hook. Once dialed, the call progress display in the local computer may dynamically update the following information for the user or subscriber: the dialed number, destination city, carrier's identity, call progress phase, call duration, call accumulated dynamic cost and call accounting dynamic saving. The call logging process logs calls which have and have not been processed by the line unit, faulty calls in which no connection was established (i.e., no ring or busy tone, call was too short, congestion tone, call establishment time was too long, call flagged as bad by subscriber, etc.).

In addition to a call process, the controller in the line unit executes time driven processes which include volume calculation per carrier and the carrier quality and performance assessment process, discussed previously. In addition, the data uploaded to the local computer is used to determine when a new carrier selection database needs to be generated. The volume calculation includes calculating the volume of each carrier's OCP on a monthly basis and computing an average. The calculated average volume is used to determine the expected volume per carrier and to recalculate the pointer to the volume discount entry for calculation of the carrier selection database. In addition, a process performed weekly calculates the expected volume according to the following formula:

$$\text{expected volume} = \frac{\text{accumulated volume}}{\text{percentage of the month passed}} \text{ (weighted with last months averages)}$$

Calculating the expected volume helps to eliminate cases where a monthly peak or changes in the usage of a carrier will cause new volumes. If weekly expected volumes differ from the average monthly volume, the carrier selection database is updated and downloaded to the line units and the appropriate OCPs are updated accordingly. The performance monitor control process decides, on a periodic basis, whether to drop a particular carrier from use. The decision is based on data collected automatically and entered manually by the subscriber, as described previously. In addition, the expiration date of promotions are tracked on a daily basis within the local computer. The expiration data of each promotion is included in the OCP parameter data.

Figure 22:
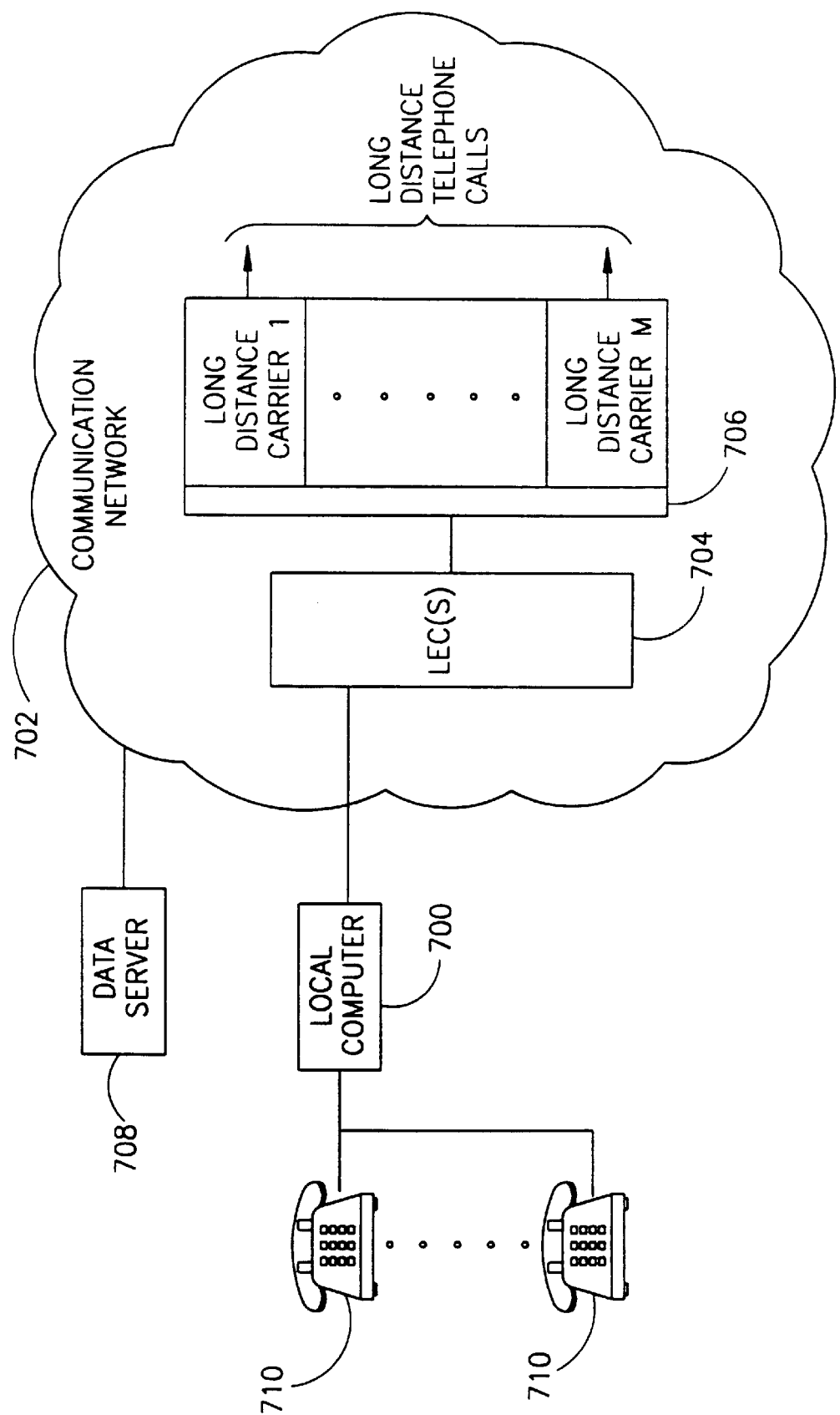
FIG. 22 is a block diagram illustrating the call management system constructed and operative in accordance with a preferred embodiment of the present invention wherein a local computer and data server are coupled to the communication system and the local computer also performs the functions of the line unit of FIG. 19.

A block diagram illustrating the call management system constructed and operative in accordance with a preferred embodiment of the present invention wherein a local computer and data server are coupled to the communication system is shown in FIG. 22. The local computer 700, in addition to performing the functions of the local computer of FIG. 18, also performs the functions of the line unit of FIG. 19. Coupled to the local computer can be any telephone compatible devices such as telephone sets, facsimile machines, etc. Shown as an example in FIG. 22 are telephone sets 710. The local computer 700 is coupled to the communications system 702. Also coupled to the communications system is a data server 708 which function similarly to the data server 412 of FIG. 18.

The communications system comprises one or more LECs 704 and one or more long distance carriers 706. In general, the communication network is the public switched telephone network (PSTN). However, the communication system 702 may, in addition, comprise the Internet, local area networks (LANs), wide area networks (WANs), private networks, public switched networks, ISDN networks, or any other network providing suitable connectivity for the local computer and the data server.

Figure 23:
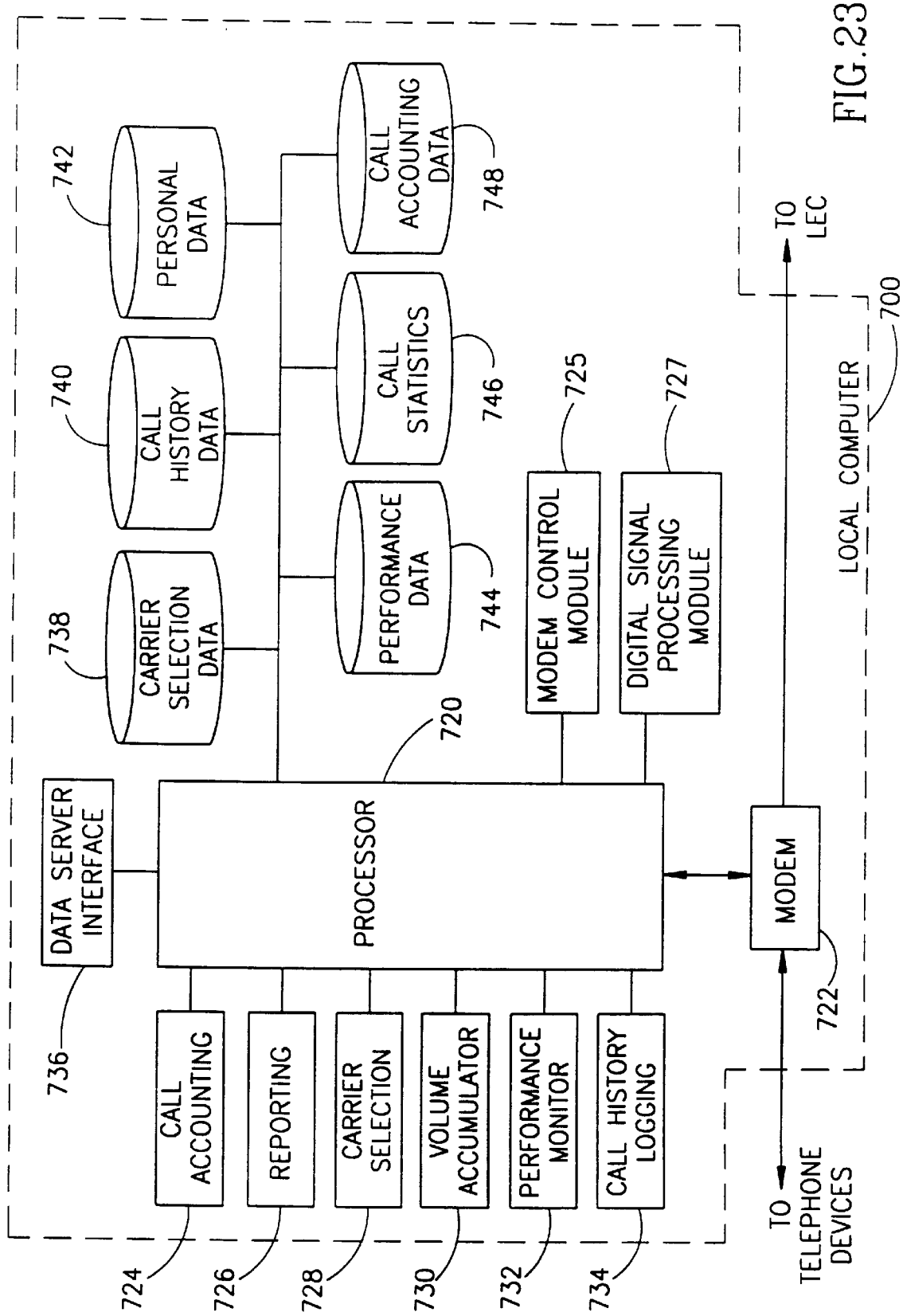
FIG. 23 is a detailed block diagram illustrating the local computer of FIG. 22.

A detailed block diagram of the local computer 700 of FIG. 22 is shown in FIG. 23. The local computer comprises a data server interface 736, call accounting module 724, reporting module 726, carrier selection module 728, volume accumulator 730, performance monitor module 732 and call history logging module 734. In addition, the local computer comprises a modem control module 725 and a digital signal processing module 727. The processor also comprises a number of databases including: a carrier selection database 738, call history database 740, personal information database 742, performance information database 744, call statistics database 746 and a call accounting database 748. The local computer also comprises a modem 722 which may physically be internal or external to the actual local computer. A processor 720 controls and manages each of the modules, the modem and the databases. Pursuant to this embodiment of the invention, the data server interface 736 interfaces the local computer to the data server. The modules and databases of the local computer function similarly to those of the embodiment wherein the local computer and the line are separate components (e.g., FIGS. 18 and 19).

The local computer 700 of FIG. 23 can serve as a stand alone generic call processing device or as the heart of a call management system. The latter will now be described in more detail.

The modem control module 725 functions to monitor and manage the modem. The module receives call processing signals generated by the modem such as off-hook, on-hook, ringback tone, busy tone, answer signals, etc. The digital signal processing module 727 functions to detect the call progress signals or tones generated on the telephone line in the event the modem cannot perform this itself but it can, however, supply the local computer with the raw audio signal on the telephone line. The digital signal processing module utilizes well known digital signal processing techniques to detect the call progress tones from the audio signals it receives. This module also functions to detect the presence of voice on the telephone line.

Figure 24:
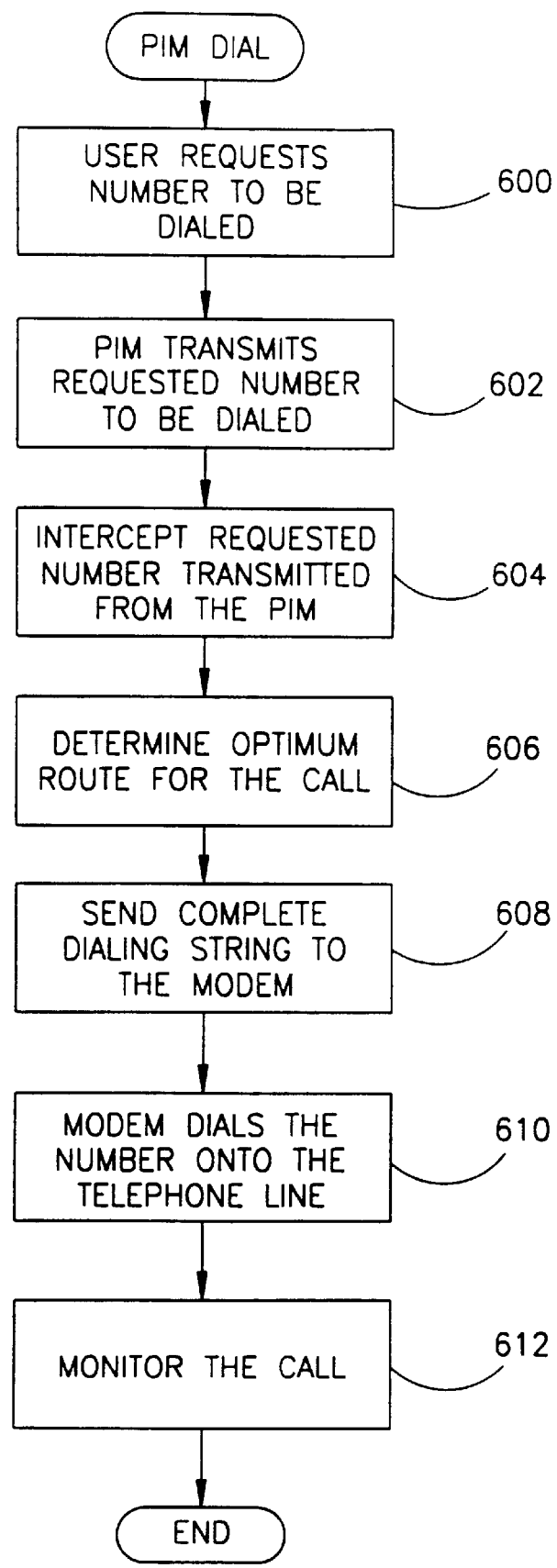
FIG. 24 is a flow chart illustrating a method of real time optimization of a call initiated by a personal information manager using the call management system of the present invention.

A flow chart illustrating a method of real time optimization of a call adapted to be used with a personal information manager using the call management system of the present invention is shown in FIG. 24. With reference to FIGS. 22 and 24, this method utilizes a personal information manager (PIM) software product or its equivalent that are widely available on the market today. Examples of such PIMs include Lotus Organizer manufactured by Lotus Corp., Cambridge, Mass., Microsoft Schedule manufactured by Microsoft, Redmond, Wash. and Sidekick manufactured by Starfish, Scotts Valley, Calif. The PIM is running on the local computer 700. A software driver operating between the PIM application and the modem hardware intercepts the dialing digits from the PIM and processes the call itself. One skilled in the art could readily craft a device driver do perform this function.

First, the caller (i.e., the user) requests a number to be dialed from within the PIM or equivalent application (step 600). Then the PIM transmits the requested number to be dialed to the modem or calling device (step 602). The device driver or intermediate software layer intercepts the requested number from the PIM (step 604). The optimum route for the call is then determined by the local computer in accordance with any of the call optimization principles of the present invention described earlier (step 606). The complete dialing string is then sent to the modem (step 608). The modem then dials the complete dialing string into the telephone line (step 610). The call is then monitored for tones and voice (step 612). The step of monitoring is described in more detail below.

The method of FIG. 24 can be performed using the modem within the local computer. The modem may be either a conventional modem that supplies call progress signals to enable the local computer to determine events such as on-hook, off-hook, call start/end, busy tone, congestion tone, etc. As an alternative, a modem that does not supply call progress tones can be also be used but it must be capable of routing the telephone line signal to the local computer. The local computer, utilizing the digital signal processing module, analyzes the audio to detect the call progress signals. In both cases, the modem must be able to connect and disconnect the telephone device to and from the telephone line, respectively.

Examples of a commercially available modem that is suitable for use in the call management system of the present invention is the PhoneBlaster manufactured by Creative Labs, Milpitas, Calif. and the Sportster voice modem manufactured by US Robotics, Skokie, Ill.

To intercept calls made using a regular telephone device such as a telephone set 710 or computer 712 (FIG. 22), the modem detects the telephone going off-hook and is instructed to disconnect the handset from the line and to supply an artificial dial tone (rather than the exchange). The local computer receives the dialing digits as the caller dials them. Once all the digits are received, the local computer disconnects from the handset and connects to the line itself. It then dials the optimized number onto the telephone line. After completing the dialing, the local computer connects the telephone handset to the line and begins a line monitoring function. It functions to detect tones transmitted by the exchange. For example, it detects when ringback tone stops and voice starts. Thus, it can distinguish start of the call (i.e., going on-hook) which is the basis for the billing process.

Figure 25A:
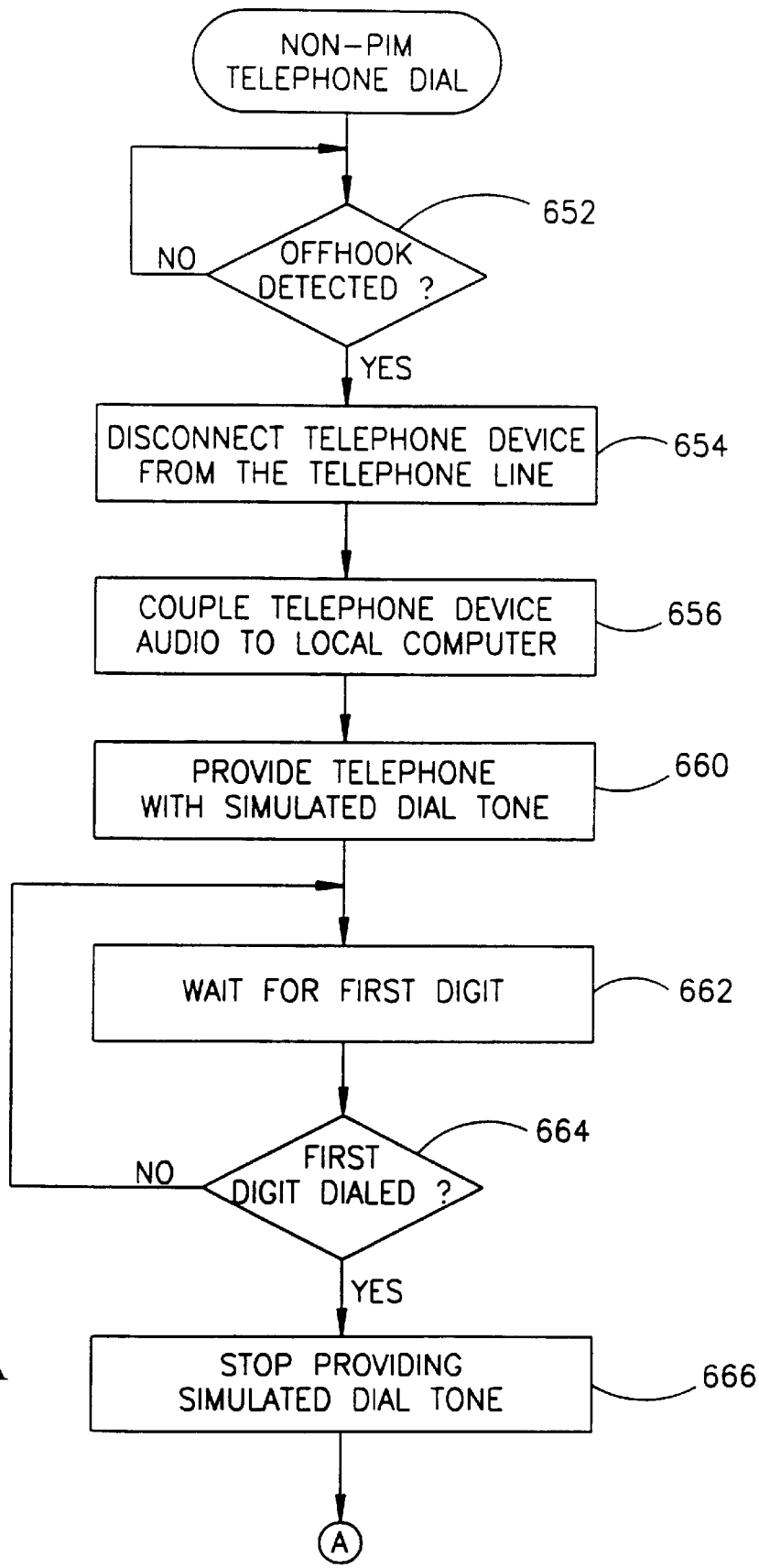
FIG. 25 is a flow chart illustrating a method of real time optimization of a call initiated by a regular telephone using the call management system of the present invention.
Figure 25B:
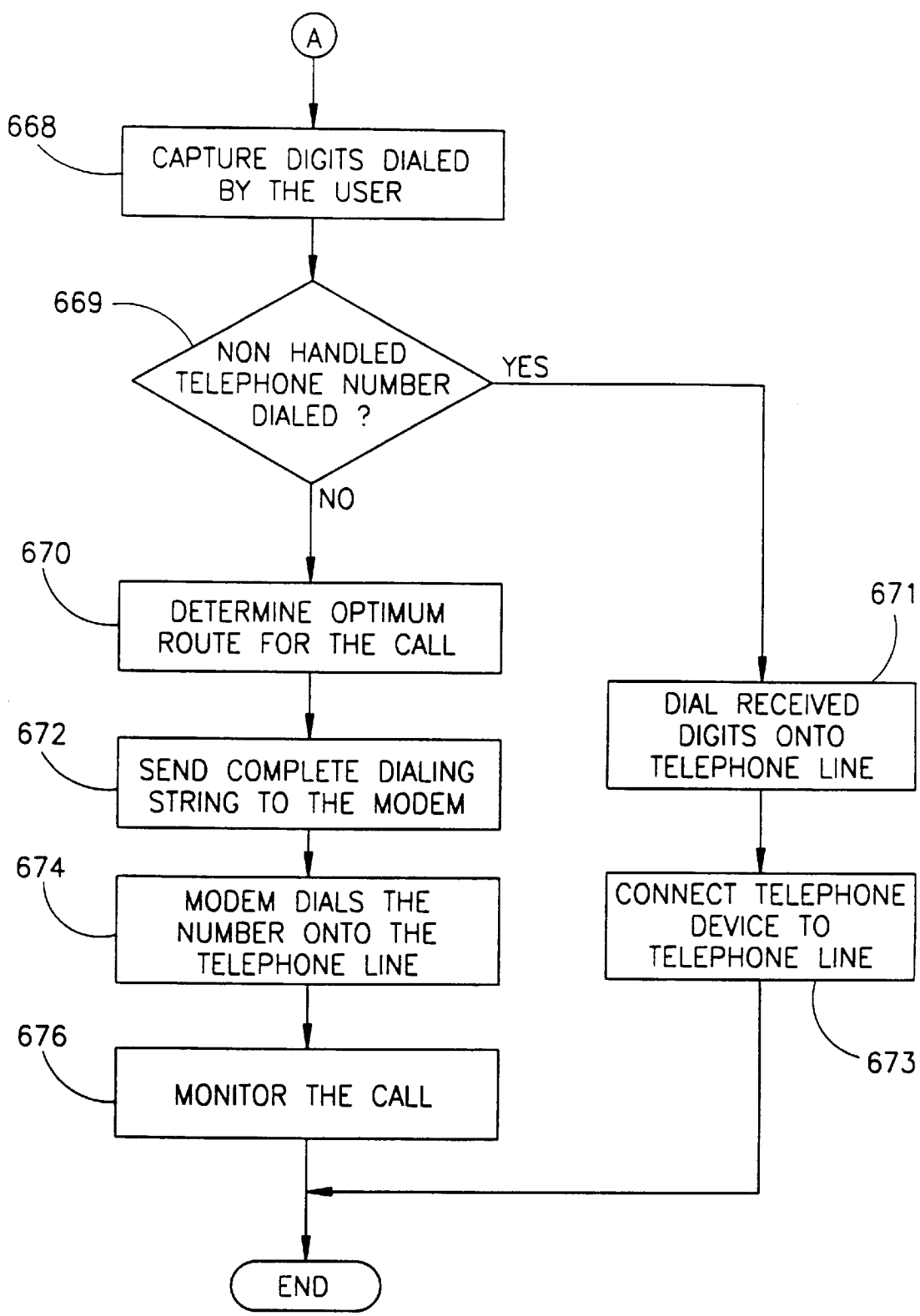

A flow chart illustrating a method of real time optimization of a call adapted to be initiated by a regular telephone using the call management system of the present invention is shown in FIG. 25. With reference to FIGS. 22 and 25, initially, the telephone devices (e.g., sets 710) are connected through to the telephone line. The modem is in a listening mode and waiting for an off-hook event (step 652). Once an off-hook event has been detected, which was not a response to an incoming call, the telephone devices are disconnected from the telephone line (step 654). If the modem is able to report the DTMF or pulse digits, they are reported to the local computer for processing and analysis by the carrier selection module. Otherwise, the audio is input into the local computer and the dialed digits are retrieved using conventional signal processing techniques. The telephone audio is then fed into the local computer (step 656). The telephone devices are then provided with simulated dial tone (step 660). Once the first dialing digit is received (steps 662, 664) the modem stops providing simulated dial tone (step 666). The remainder of the digits dialed by the caller are captured by the modem and reported to the local computer (step 668). Or, if the modem is not capable of capturing the tones, the audio is channeled into the local computer and the digits analyzed using conventional signal processing techniques. If a telephone number not handled by the carrier selection module is entered by the user (step 669), the number is dialed onto the telephone line and the carrier selection process is not necessary (step 671). Once dialed, the telephone device is connected to the telephone line (step 673). If a nonhandled telephone number is not detected, the optimum route for the call is then determined by the local computer in accordance with any of the call optimization principles of the present invention described earlier (step 670). The complete dialing string is then sent to the modem (step 672). The modem then dials the complete dialing string into the telephone line (step 674). The call is then monitored for tones and voice (step 676).

The call management system of the present invention can be adapted to perform call monitoring tone and voice detection functions using the capabilities of the local computer 700. To perform these functions, the modem 722 (FIG. 23) must have the capabilities as described above. As is well known in the art, the various signaling between a telephone and a central office (CO) exchange proceeds as follows. First, a caller takes the telephone off-hook. The exchange detects the telephone going off-hook and begins to provide dial tone. The caller then dials the first digit and the exchange stops providing tone at this point. The caller dials additional digits and the exchange waits until enough digits are received. The exchange then provides one of the following tones: ringback, busy or fast busy (e.g., congestion or reorder tone). The next event that occurs is the called party's telephone going off-hook. At this point, the exchange stops the ringback tone and voice begins until the call is terminated.

Figure 26A:
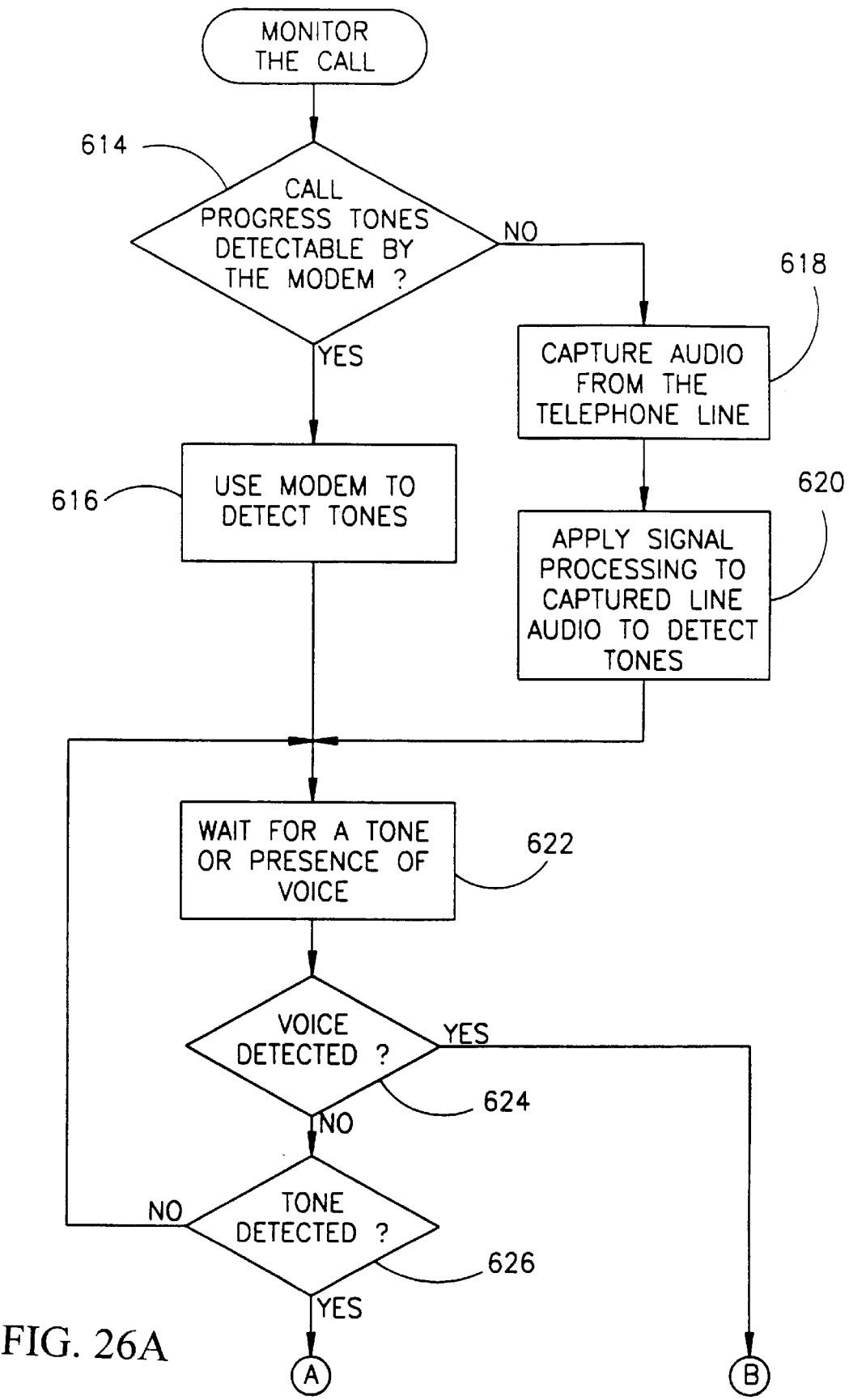
FIG. 26 is a flow chart illustrating a method of monitoring the call which is utilized by the method of FIGS. 24 and 25.
Figure 26B:
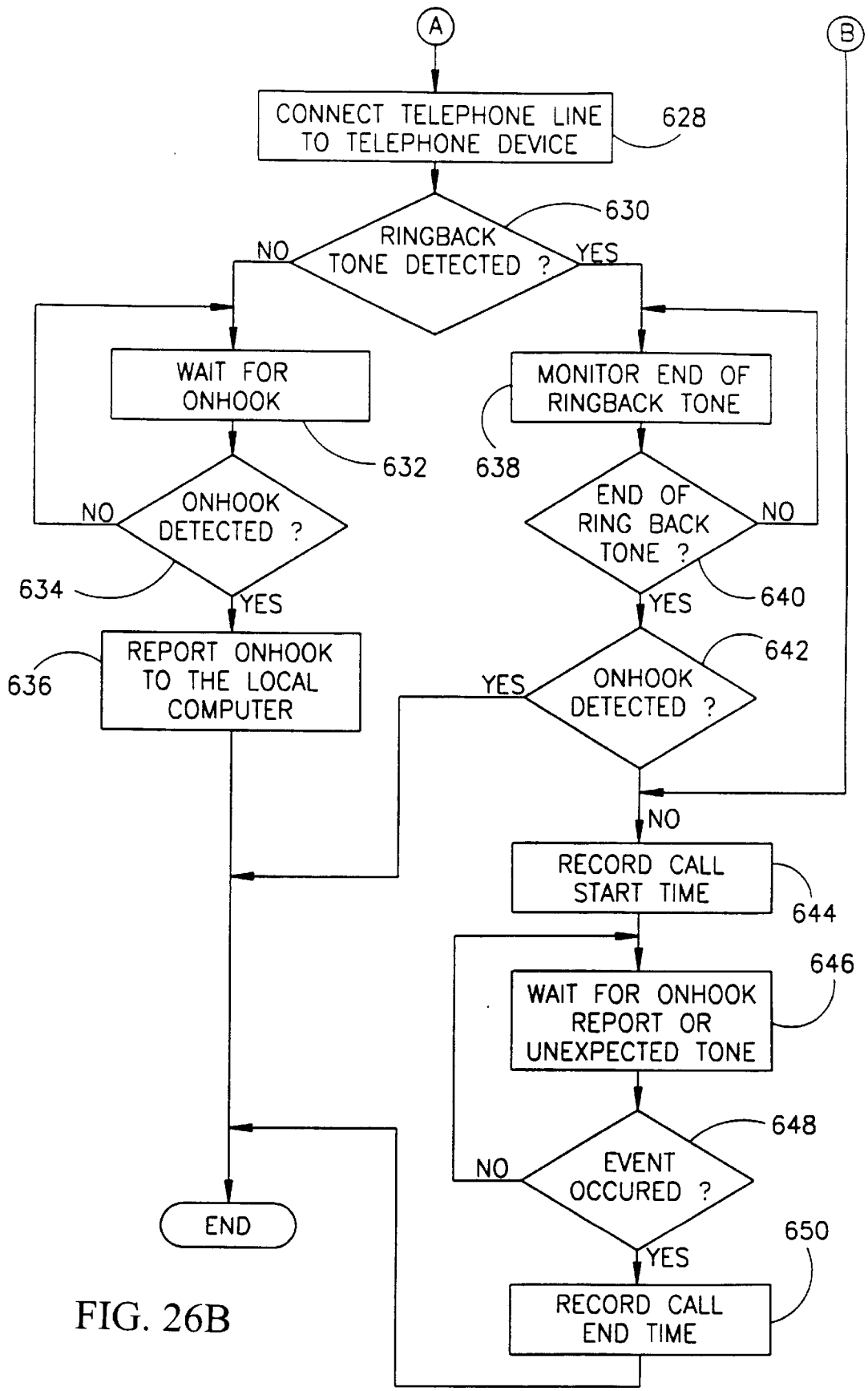

A flow chart illustrating a method of monitoring the call which is utilized by the method of FIGS. 24 and 25 is shown in FIG. 26. First, it is determined whether call progress tones are detectable by the modem (step 614). If they are, the modem is used in the following steps to detect tones (step 616). If the modem cannot detect tones, the modem and the local computer are configured to capture the audio from the telephone line (step 618). Signal processing techniques well known in the art, are applied to the captured audio to perform tone detection (step 620).

In either case, the local computer then waits for the detection of tone, the end of ringback tone or the start of voice after the ringback tone ceases in order to determine an accurate call start time (step 622). Voice is detected using well known signal processing techniques on the captured audio. If voice is detected (step 624), the start time of the call is recorded (step 644). Once an on-hook report or unexpected tone (steps 646, 648) is received by the local computer, the call end time is recorded (step 650) and the process terminates.

If voice is not detected in step 624, it is checked whether tone is present (step 626). If tone is not present, control returns to step 622 to wait for tone or voice again. If tone is detected, the local computer connects the telephone line to the telephone devices (step 628). The presence of ringback tone is then checked for (step 630). If no ringback tone is detected, the local computer waits for an on-hook condition (steps 632, 634). Once an detected, the on-hook event is reported to the appropriate modules in the local computer (step 636) and the process is terminated.

If, in step 630, ringback tone is detected, the end of the ringback tone is monitored (steps 638, 640). If an on-hook event is detected the process terminates, meaning the party hung up the telephone. If no on-hook event is detected in step 642, the start time of the call is recorded (step 644). Once an on-hook report or unexpected tone (steps 646, 648) is received by the local computer, the call end time is recorded (step 650) and the process terminates.

While the invention has been described with respect to a limited number of embodiments, it will be appreciated that many variations, modifications and other applications of the invention may be made.

We claim:

1. A telecommunication call management system for determining an optimum telecommunication carrier for a telephone call made by a subscriber, said telephone call routed through a telephone line to a local exchange carrier, said local exchange carrier coupled to one of M long distance carriers, the system comprising: a data server coupled to a communications network, said data server for managing a database containing tariff and geographical related information on local and long distance carriers, local exchange, telephone exchange location related data and subscribers and for generating a carrier selection database from selected deterministic and statistical parameters; and a local computer coupled to a plurality of telephone devices, said local exchange carrier and said communications network, said local computer for intercepting a call dialed by said subscriber, monitoring said telephone line, choosing said optimum carrier from said carrier selection database and placing said call utilizing said optimum carrier wherein said data server comprises a processor for controlling the operation of said data server;

a server database interface coupled to said processor, said server database interface for fulfilling database requests issued by said processor;

a server database coupled to said server database interface, said server database containing tariff related information on local and long distance carriers;

a client communications module coupled to said processor and to said communications network, said client communications module for managing communications between said processor and said local computer;

a call accounting module for processing call data uploaded from said local computer;

a personal data database holding data relevant to said subscriber's location and calling preferences; and a local computer database preparation module coupled to said processor, said local computer database preparation module determining, a priori, optimum carriers for calls placed by said subscriber from said subscriber's location to almost all possible destinations, said local computer database preparation module utilizing said optimum carriers in constructing said carrier selection database.

2. The system according to claim 1, further comprising a reporting module coupled to said processor.

3. A telecommunication call management system for determining an optimum telecommunication carrier for a telephone call made by a subscriber, said telephone call routed through a telephone line to a local exchange carrier, said local exchange carrier coupled to one of M long distance carriers, the system comprising: a data server coupled to a communications network, said data server for managing a database containing tariff and geographical related information on local and long distance carriers, local exchange, telephone exchange location related data and subscribers and for generating a carrier selection database from selected deterministic and statistical parameters; and a local computer coupled to a plurality of telephone devices, said local exchange carrier and said communications network, said local computer for intercepting a call dialed by said subscriber, monitoring said telephone line, choosing said optimum carrier from said carrier selection database and placing said call utilizing said optimum carrier wherein said local computer comprises a processor controller for controlling the operation of said local computer;

a modem coupled to said processor;

a modem control module coupled to said processor for managing and controlling said modem;

a data server interface coupled to said processor, said data server interface for interfacing with said data server through said communications network; and carrier selection means comprising a carrier selection database for enabling said at least one line unit to determine said optimum carrier for telephone call.

4. The system according to claim 3, wherein said modem is able to connect and disconnect said telephone devices to said telephone line.

5. The system according to claim 3, wherein said modem is adapted to channel an audio signal from either said telephone devices or said telephone line to said local computer.

6. The system according to claim 3, wherein said modem is adapted to report call progress signals whereby said local computer can determine start and end times of said telephone call.

7. The system according to claim 3, wherein said local computer comprises a digital signal processing module for detecting call progress signals in an audio signal present on said telephone line.

8. The system according to claim 3, wherein said modem comprises:

a dialing receiver for intercepting digits dialed by said subscriber using one of said telephone devices;

a dialer for receiving a dialing string from said processor and causing said dialing string to be dialed onto said telephone line;

a pass through having a first and second state, both said first and said second states controlled by said processor, said first state blocking said telephone devices from said telephone line, said second state coupling said telephone devices to said telephone line;

a line monitor for detecting and interpreting signals originating from said telephone devices or from said telephone line; and means for connecting an audio signal from said telephone line to said local computer.

9. The system according to claim 8, wherein said dialing receiver detects and decodes pulse and dual tone multiple frequency tones.

10. The system according to claim 3, wherein said local computer comprises:

a call history logging module coupled to said processor, said call history logging module logging calls placed by said subscriber and determining subscriber call characteristics; and a performance monitoring module coupled to said processor, said performance monitoring module for managing the selection of said long distance carriers based on quality and performance of their connections.

11. The system according to claim 3, wherein said local computer comprises:

a call accounting module coupled to said processor, said call accounting module for determining subscriber calling characteristics; and a call accounting database coupled to said processor for storing call accounting information gathered by said local computer.

12. The system according to claim 3, wherein said local computer comprises a reporting module coupled to said processor, said reporting module for producing reports from data collected by said local computer both automatically and manually.

13. The system according to claim 3, wherein said local computer comprises a personal information database coupled to said processor, said personal information database storing data downloaded from said data server, data entered by said subscriber or data collected via said local computer.

* * * * *